US011755602B2

(12) United States Patent
Smith et al.

(10) Patent No.: US 11,755,602 B2
(45) Date of Patent: Sep. 12, 2023

(54) CORRELATING PARALLELIZED DATA FROM DISPARATE DATA SOURCES TO AGGREGATE GRAPH DATA PORTIONS TO PREDICTIVELY IDENTIFY ENTITY DATA

(71) Applicant: data.world, Inc., Austin, TX (US)

(72) Inventors: Shawn Andrew Pardue Smith, Austin, TX (US); Bryon Kristen Jacob, Austin, TX (US)

(73) Assignee: data.world, Inc., Austin, TX (US)

(*) Notice: Subject to any disclaimer, the term of this patent is extended or adjusted under 35 U.S.C. 154(b) by 36 days.

(21) Appl. No.: 17/461,982

(22) Filed: Aug. 30, 2021

(65) Prior Publication Data
US 2022/0058193 A1 Feb. 24, 2022

Related U.S. Application Data

(63) Continuation-in-part of application No. 17/037,005, filed on Sep. 29, 2020, now Pat. No. 11,423,039.
(Continued)

(51) Int. Cl.
*G06F 16/2458* (2019.01)
*G06F 16/25* (2019.01)
(Continued)

(52) U.S. Cl.
CPC ........ *G06F 16/2471* (2019.01); *G06F 16/215* (2019.01); *G06F 16/2465* (2019.01);
(Continued)

(58) Field of Classification Search
None
See application file for complete search history.

(56) References Cited

U.S. PATENT DOCUMENTS 5,845,285 A 12/1998 Klein
6,144,962 A 11/2000 Weinberg et al.
(Continued)

FOREIGN PATENT DOCUMENTS

AU 2012289936 A1 2/2014
CA 2820994 A1 1/2014
(Continued)

OTHER PUBLICATIONS

"Data.World Comes Out of Stealth to Make Open Data Easier." Americaninno.com, AustinInno, Jul. 11, 2016, Retrieved from the Internet; URL: www.americaninno.com/austin/open-data-tech-brett-hurts-startup-data-world-launches/ [retrieved Jan. 27, 2020].
(Continued)

*Primary Examiner* — Kim T Nguyen
(74) *Attorney, Agent, or Firm* — KOKKA & BACKUS, PC

(57) ABSTRACT

Various embodiments relate generally to data science and data analysis, computer software and systems, and data-driven control systems and algorithms based on graph-based data arrangements, among other things, and, more specifically, to a computing platform configured to receive or analyze datasets in parallel by implementing, for example, parallel computing processor systems to correlate subsets of parallelized data from disparately-formatted data sources to identify entity data and to aggregate graph data portions. In some examples, a method may include classifying data parallelized data to identify a class of observation data, constructing one or more content graphs in a graph data format, correlating parallelized data to other subsets of parallelized data associated with a class of observation data; and aggregating observation data to represent an individual entity.

20 Claims, 12 Drawing Sheets

Related U.S. Application Data which is a continuation of application No. 16/120,057, filed on Aug. 31, 2018, now Pat. No. 10,853,376, which is a continuation of application No. 15/186,514, filed on Jun. 19, 2016, now Pat. No. 10,102,258, application No. 17/461,982, filed on Aug. 30, 2021 is a continuation-in-part of application No. 16/457,766, filed on Jun. 28, 2019, now Pat. No. 11,194,830, which is a continuation of application No. 15/454,923, filed on Mar. 9, 2017, now Pat. No. 10,353,911, which is a continuation-in-part of application No. 15/186,514, filed on Jun. 19, 2016, now Pat. No. 10,102,258, application No. 17/461,982, filed on Aug. 30, 2021 is a continuation-in-part of application No. 17/332,354, filed on May 27, 2021, which is a continuation of application No. 16/036,834, filed on Jul. 16, 2018, now Pat. No. 11,042,560, which is a continuation-in-part of application No. 15/186,514, filed on Jun. 19, 2016, now Pat. No. 10,102,258, and a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911, and a continuation-in-part of application No. 15/926,999, filed on Mar. 20, 2018, now Pat. No. 11,016,931, and a continuation-in-part of application No. 15/927,004, filed on Mar. 20, 2018, now Pat. No. 11,036,716, and a continuation-in-part of application No. 15/439,908, filed on Feb. 22, 2017, now Pat. No. 10,452,975, and a continuation-in-part of application No. 15/985,702, filed on May 22, 2018, now Pat. No. 11,068,475, and a continuation-in-part of application No. 15/985,704, filed on May 22, 2018, now Pat. No. 11,068,847, and a continuation-in-part of application No. 15/985,705, filed on May 22, 2018, now Pat. No. 11,086,896, said application No. 17/332,354 is a continuation of application No. 16/036,836, filed on Jul. 16, 2018, now Pat. No. 11,042,556, which is a continuation-in-part of application No. 15/186,514, filed on Jun. 19, 2016, now Pat. No. 10,102,258, and a continuation-in-part of application No. 15/186,516, filed on Jun. 19, 2016, now Pat. No. 10,452,667, and a continuation-in-part of application No. 15/454,923, filed on Mar. 9, 2017, now Pat. No. 10,353,911, and a continuation-in-part of application No. 15/926,999, filed on Mar. 20, 2018, now Pat. No. 11,016,931, and a continuation-in-part of application No. 15/927,004, filed on Mar. 20, 2018, now Pat. No. 11,036,716, and a continuation-in-part of application No. 15/439,908, filed on Feb. 22, 2017, now Pat. No. 10,452,975, and a continuation-in-part of application No. 15/985,702, filed on May 22, 2018, now Pat. No. 11,068,475, and a continuation-in-part of application No. 15/985,704, filed on May 22, 2018, now Pat. No. 11,068,847, and a continuation-in-part of application No. 15/985,705, filed on May 22, 2018, now Pat. No. 11,086,896, application No. 17/469,982, filed on Aug. 30, 2021 is a continuation-in-part of application No. 17/333,914, filed on May 28, 2021, which is a continuation of application No. 15/985,702, filed on May 22, 2018, now Pat. No. 11,068,475, and a continuation-in-part of application No. 15/186,514, filed on Jun. 19, 2016, now Pat. No. 10,102,258, and a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911, and a continuation-in-part of application No. 15/926,999, filed on Mar. 20, 2018, now Pat. No. 11,016,931, and a continuation-in-part of application No. 15/927,004, filed on Mar. 20, 2018, now Pat. No. 11,036,716, application No. 17/461,982, filed on Aug. 30, 2021 is a continuation-in-part of application No. 17/004,570, filed on Aug. 27, 2020, which is a continuation of application No. 16/137,292, filed on Sep. 20, 2018, now Pat. No. 10,824,637, which is a continuation-in-part of application No. 15/454,923, filed on Mar. 9, 2017, now Pat. No. 10,353,911, and a continuation of application No. 15/926,999, filed on Mar. 20, 2018, now Pat. No. 11,016,931, and a continuation of application No. 15/927,004, filed on Mar. 20, 2018, now Pat. No. 11,036,716, and a continuation of application No. 15/985,702, filed on May 22, 2018, now Pat. No. 11,068,475, and a continuation of application No. 15/985,704, filed on May 22, 2018, now Pat. No. 11,068,847.

(51) Int. Cl.
*G06N 5/04* (2023.01)
*G06F 16/215* (2019.01)

(52) U.S. Cl.
CPC .......... *G06F 16/252* (2019.01); *G06F 16/256* (2019.01); *G06F 16/258* (2019.01); *G06N 5/04* (2013.01)

(56) References Cited

U.S. PATENT DOCUMENTS

| | | | |
|---|---|---|---|
| 6,317,752 B1 | 11/2001 | Lee et al. | |
| 6,466,933 B1 * | 10/2002 | Huang | G06F 16/2435 707/999.005 |
| 6,529,909 B1 | 3/2003 | Bowman-Amuah | |
| 6,768,986 B2 | 7/2004 | Cras et al. | |
| 6,961,728 B2 | 11/2005 | Wynblatt et al. | |
| 7,080,090 B2 | 7/2006 | Shah et al. | |
| 7,143,046 B2 | 11/2006 | Babu et al. | |
| 7,146,375 B2 | 12/2006 | Egilsson et al. | |
| 7,680,862 B2 | 3/2010 | Chong et al. | |
| 7,702,639 B2 | 4/2010 | Stanley et al. | |
| 7,761,407 B1 | 7/2010 | Stern | |
| 7,818,352 B2 | 10/2010 | Krishnamoorthy et al. | |
| 7,836,063 B2 | 11/2010 | Salazar et al. | |
| 7,853,081 B2 | 12/2010 | Thint | |
| 7,856,416 B2 | 12/2010 | Hoffman et al. | |
| 7,877,350 B2 | 1/2011 | Stanfill et al. | |
| 7,953,695 B2 | 5/2011 | Roller et al. | |
| 7,987,179 B2 | 7/2011 | Ma et al. | |
| 8,037,108 B1 | 10/2011 | Chang | |
| 8,060,472 B2 | 11/2011 | Itai et al. | |
| 8,099,382 B2 | 1/2012 | Liu et al. | |
| 8,170,981 B1 | 5/2012 | Tewksbary | |
| 8,275,784 B2 | 9/2012 | Cao et al. | |
| 8,296,200 B2 | 10/2012 | Mangipudi et al. | |
| 8,312,389 B2 | 11/2012 | Crawford et al. | |
| 8,429,179 B1 | 4/2013 | Mirhaji | |
| 8,521,565 B2 | 8/2013 | Faulkner et al. | |
| 8,538,985 B2 | 9/2013 | Betawadkar-Norwood et al. | |
| 8,583,631 B1 | 11/2013 | Ganapathi et al. | |
| 8,616,443 B2 | 12/2013 | Butt et al. | |
| 8,640,056 B2 | 1/2014 | Helfman et al. | |
| 8,719,252 B2 | 5/2014 | Miranker et al. | |
| 8,762,160 B2 | 6/2014 | Lulla | |
| 8,799,240 B2 | 8/2014 | Stowe et al. | |
| 8,831,070 B2 | 9/2014 | Huang et al. | |
| 8,843,502 B2 | 9/2014 | Elson et al. | |
| 8,849,783 B2 * | 9/2014 | Abramovitz | G11B 27/34 707/705 |

(56) References Cited

U.S. PATENT DOCUMENTS

| | | | |
|---|---|---|---|
| 8,849,784 B2 * | 9/2014 | Alber | G11B 27/105 |
| | | | 369/53.41 |
| 8,856,643 B2 | 10/2014 | Drieschner | |
| 8,892,513 B2 | 11/2014 | Forsythe | |
| 8,930,337 B2 * | 1/2015 | Studer | G06F 40/226 |
| | | | 707/769 |
| 8,935,272 B2 | 1/2015 | Ganti et al. | |
| 8,943,313 B2 | 1/2015 | Glew et al. | |
| 8,965,915 B2 | 2/2015 | Ganti et al. | |
| 8,990,236 B2 | 3/2015 | Mizrahy et al. | |
| 8,996,492 B2 * | 3/2015 | Paradies | G06F 16/221 |
| | | | 707/705 |
| 8,996,559 B2 | 3/2015 | Ganti et al. | |
| 8,996,978 B2 | 3/2015 | Richstein et al. | |
| 9,002,860 B1 | 4/2015 | Ghemawat | |
| 9,020,921 B2 * | 4/2015 | Alber | G11B 27/36 |
| | | | 707/705 |
| 9,171,077 B2 | 10/2015 | Balmin et al. | |
| 9,218,365 B2 | 12/2015 | Irani et al. | |
| 9,244,952 B2 | 1/2016 | Ganti et al. | |
| 9,268,820 B2 | 2/2016 | Henry | |
| 9,268,950 B2 | 2/2016 | Gkoulalas-Divanis et al. | |
| 9,396,283 B2 | 7/2016 | Miranker et al. | |
| 9,454,611 B2 | 9/2016 | Henry | |
| 9,495,429 B2 | 11/2016 | Miranker | |
| 9,560,026 B1 | 1/2017 | Worsley | |
| 9,607,042 B2 | 3/2017 | Long | |
| 9,613,152 B2 | 4/2017 | Kucera | |
| 9,659,081 B1 | 5/2017 | Ghodsi et al. | |
| 9,690,792 B2 | 6/2017 | Bartlett et al. | |
| 9,696,981 B2 | 7/2017 | Martin et al. | |
| 9,710,526 B2 | 7/2017 | Couris et al. | |
| 9,710,568 B2 | 7/2017 | Srinivasan et al. | |
| 9,720,958 B2 | 8/2017 | Bagehorn et al. | |
| 9,760,602 B1 | 9/2017 | Ghodsi et al. | |
| 9,769,032 B1 | 9/2017 | Ghodsi et al. | |
| 9,798,737 B2 | 10/2017 | Palmer | |
| 9,836,302 B1 | 12/2017 | Hunter et al. | |
| 9,959,337 B2 | 5/2018 | Ghodsi et al. | |
| 9,990,230 B1 | 6/2018 | Stoica et al. | |
| 10,095,735 B2 | 10/2018 | Ghodsi et al. | |
| 10,102,258 B2 | 10/2018 | Jacob et al. | |
| 10,176,234 B2 | 1/2019 | Gould et al. | |
| 10,216,860 B2 | 2/2019 | Miranker et al. | |
| 10,248,297 B2 | 4/2019 | Beechuk et al. | |
| 10,296,329 B2 | 5/2019 | Hunter et al. | |
| 10,318,567 B2 | 6/2019 | Henry | |
| 10,324,925 B2 | 6/2019 | Jacob et al. | |
| 10,346,429 B2 | 7/2019 | Jacob et al. | |
| 10,353,911 B2 | 7/2019 | Reynolds et al. | |
| 10,361,928 B2 | 7/2019 | Ghodsi et al. | |
| 10,438,013 B2 | 10/2019 | Jacob et al. | |
| 10,452,677 B2 | 10/2019 | Jacob et al. | |
| 10,452,975 B2 | 10/2019 | Jacob et al. | |
| 10,474,501 B2 | 11/2019 | Ghodsi et al. | |
| 10,474,736 B1 | 11/2019 | Stoica et al. | |
| 10,545,986 B2 | 1/2020 | Tappan et al. | |
| 10,546,001 B1 | 1/2020 | Nguyen et al. | |
| D876,454 S | 2/2020 | Knowles et al. | |
| 10,558,664 B2 | 2/2020 | Armbrust et al. | |
| D877,167 S | 3/2020 | Knowles et al. | |
| D879,112 S | 3/2020 | Hejazi et al. | |
| 10,606,675 B1 | 3/2020 | Luszczak et al. | |
| 10,645,548 B2 | 5/2020 | Reynolds et al. | |
| 10,664,509 B1 | 5/2020 | Reeves et al. | |
| 10,673,887 B2 | 6/2020 | Crabtree et al. | |
| 10,678,536 B2 | 6/2020 | Hunter et al. | |
| 10,691,299 B2 | 6/2020 | Broek et al. | |
| 10,691,433 B2 | 6/2020 | Shankar et al. | |
| 10,713,314 B2 | 7/2020 | Yan et al. | |
| 10,769,130 B1 | 9/2020 | Armbrust et al. | |
| 10,769,535 B2 | 9/2020 | Lindsley | |
| 10,810,051 B1 | 10/2020 | Shankar et al. | |
| 10,922,308 B2 | 2/2021 | Griffith | |
| 10,984,008 B2 | 4/2021 | Jacob et al. | |
| 11,042,556 B2 | 6/2021 | Griffith et al. | |
| 11,042,560 B2 | 6/2021 | Griffith et al. | |
| 11,068,453 B2 | 7/2021 | Griffith | |
| 11,068,475 B2 | 7/2021 | Boutros et al. | |
| 11,068,847 B2 | 7/2021 | Boutros et al. | |
| 11,093,539 B2 | 8/2021 | Henry | |
| 11,294,972 B2 | 4/2022 | George et al. | |
| 11,327,991 B2 | 5/2022 | Reynolds et al. | |
| 11,468,049 B2 * | 10/2022 | Griffith | G06F 16/2423 |
| 11,500,831 B2 | 11/2022 | Griffith et al. | |
| 2002/0133476 A1 | 9/2002 | Reinhardt | |
| 2002/0143755 A1 | 10/2002 | Wynblatt et al. | |
| 2003/0093597 A1 | 5/2003 | Marshak et al. | |
| 2003/0120681 A1 | 6/2003 | Baclawski | |
| 2003/0208506 A1 | 11/2003 | Greenfield et al. | |
| 2004/0064456 A1 | 4/2004 | Fong et al. | |
| 2005/0004888 A1 | 1/2005 | McCrady et al. | |
| 2005/0010550 A1 | 1/2005 | Potter et al. | |
| 2005/0010566 A1 | 1/2005 | Cushing et al. | |
| 2005/0234957 A1 | 10/2005 | Olson et al. | |
| 2005/0246357 A1 | 11/2005 | Geary et al. | |
| 2005/0278139 A1 | 12/2005 | Glaenzer et al. | |
| 2006/0100995 A1 | 5/2006 | Albornoz et al. | |
| 2006/0117057 A1 | 6/2006 | Legault et al. | |
| 2006/0129605 A1 | 6/2006 | Doshi | |
| 2006/0161545 A1 | 7/2006 | Pura | |
| 2006/0168002 A1 | 7/2006 | Chesley | |
| 2006/0218024 A1 | 9/2006 | Lulla | |
| 2006/0235837 A1 | 10/2006 | Chong et al. | |
| 2007/0027904 A1 | 2/2007 | Chow et al. | |
| 2007/0055662 A1 | 3/2007 | Edelman et al. | |
| 2007/0139227 A1 | 6/2007 | Speirs et al. | |
| 2007/0179760 A1 | 8/2007 | Smith | |
| 2007/0203933 A1 | 8/2007 | Iversen et al. | |
| 2007/0271604 A1 | 11/2007 | Webster et al. | |
| 2007/0276875 A1 | 11/2007 | Brunswig et al. | |
| 2008/0046427 A1 | 2/2008 | Lee et al. | |
| 2008/0091634 A1 | 4/2008 | Seeman | |
| 2008/0140609 A1 | 6/2008 | Werner et al. | |
| 2008/0162550 A1 | 7/2008 | Fey | |
| 2008/0162999 A1 | 7/2008 | Schlueter et al. | |
| 2008/0216060 A1 | 9/2008 | Vargas | |
| 2008/0240566 A1 | 10/2008 | Thint | |
| 2008/0256026 A1 | 10/2008 | Hays | |
| 2008/0294996 A1 | 11/2008 | Hunt et al. | |
| 2008/0319829 A1 | 12/2008 | Hunt et al. | |
| 2009/0006156 A1 | 1/2009 | Hunt et al. | |
| 2009/0013281 A1 | 1/2009 | Helfman et al. | |
| 2009/0018996 A1 | 1/2009 | Hunt et al. | |
| 2009/0064053 A1 | 3/2009 | Crawford et al. | |
| 2009/0094416 A1 | 4/2009 | Baeza-Yates et al. | |
| 2009/0106734 A1 | 4/2009 | Riesen et al. | |
| 2009/0119254 A1 | 5/2009 | Cross et al. | |
| 2009/0132474 A1 | 5/2009 | Ma et al. | |
| 2009/0132503 A1 | 5/2009 | Sun et al. | |
| 2009/0138437 A1 | 5/2009 | Krishnamoorthy et al. | |
| 2009/0150313 A1 | 6/2009 | Heilper et al. | |
| 2009/0157630 A1 | 6/2009 | Yuan | |
| 2009/0182710 A1 | 7/2009 | Short et al. | |
| 2009/0198693 A1 | 8/2009 | Pura | |
| 2009/0234799 A1 | 9/2009 | Betawadkar-Norwood et al. | |
| 2009/0248714 A1 | 10/2009 | Liu | |
| 2009/0300054 A1 | 12/2009 | Fisher et al. | |
| 2010/0114885 A1 | 5/2010 | Bowers et al. | |
| 2010/0138388 A1 | 6/2010 | Wakeling et al. | |
| 2010/0223266 A1 | 9/2010 | Balmin et al. | |
| 2010/0235384 A1 | 9/2010 | Itai et al. | |
| 2010/0241644 A1 | 9/2010 | Jackson et al. | |
| 2010/0250576 A1 | 9/2010 | Bowers et al. | |
| 2010/0250577 A1 | 9/2010 | Cao et al. | |
| 2010/0268722 A1 | 10/2010 | Yalamanchi et al. | |
| 2010/0306240 A1 * | 12/2010 | Berce | G06F 16/86 |
| | | | 707/769 |
| 2010/0332453 A1 | 12/2010 | Prahlad et al. | |
| 2011/0093467 A1 * | 4/2011 | Sharp | G06F 16/2228 |
| | | | 707/E17.069 |
| 2011/0153047 A1 | 6/2011 | Cameron et al. | |
| 2011/0202560 A1 | 8/2011 | Bowers et al. | |
| 2011/0283231 A1 | 11/2011 | Richstein et al. | |

(56) References Cited

U.S. PATENT DOCUMENTS

| | | |
|---|---|---|
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0086022 A1* | 4/2013 | Black, III .............. G11B 27/36 707/705 |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0318062 A1* | 11/2013 | Studer .................. G06F 40/226 707/705 |
| 2013/0318070 A1 | 11/2013 | Wu et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0113638 A1 | 4/2014 | Zhang et al. |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0172810 A1* | 6/2014 | Paradies ............. G06F 16/9024 707/705 |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236914 A1* | 8/2014 | Okamura ............ G06F 11/3495 707/705 |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0066387 A1 | 3/2015 | Yamada et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0092527 A1 | 3/2016 | Kang et al. |
| 2016/0098418 A1 | 4/2016 | Dakshinamurthy et al. |
| 2016/0100009 A1 | 4/2016 | Zoldi et al. |
| 2016/0103908 A1 | 4/2016 | Fletcher et al. |
| 2016/0117358 A1 | 4/2016 | Schmid et al. |
| 2016/0117362 A1 | 4/2016 | Bagehorn et al. |
| 2016/0125057 A1 | 5/2016 | Gould et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |
| 2016/0225271 A1 | 8/2016 | Robichaud et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |
| 2016/0352592 A1 | 12/2016 | Sasaki et al. |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0031703 A1 | 2/2018 | Ngai et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0075115 A1 | 3/2018 | Murray et al. |

(56) References Cited

U.S. PATENT DOCUMENTS

| | | |
|---|---|---|
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0138538 A1 | 5/2019 | Stojanovic et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0286617 A1 | 9/2019 | Abu-Abed et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2019/0384571 A1 | 12/2019 | Oberbreckling et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0380009 A1 | 12/2020 | Reynolds et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374134 A1 | 12/2021 | He et al. |
| 2021/0374171 A1 | 12/2021 | Henry |
| 2021/0374555 A1 | 12/2021 | Beguerisse-Díaz et al. |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |
| 2022/0229838 A1 | 7/2022 | Jacob et al. |
| 2022/0229847 A1 | 7/2022 | Jacob et al. |
| 2022/0261411 A1 | 8/2022 | Reynolds et al. |
| 2022/0277004 A1* | 9/2022 | Griffith ............... G06F 16/2471 |
| 2022/0327119 A1 | 10/2022 | Gasper et al. |
| 2022/0337978 A1 | 10/2022 | Reynolds et al. |
| 2023/0105459 A1* | 4/2023 | Griffith ................. G06F 16/258 |
| | | 707/803 |
| 2023/0109821 A1* | 4/2023 | Griffith ................. G06F 16/258 |
| | | 707/803 |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014524124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |
| WO | 2021252805 A1 | 12/2021 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet; URL: https://www.w3.org/TR/rdb-direct-mapping/ [retrieved Mar. 7, 2019].

Beckett, D., Berners-Lee, T., "Turtle—Terse RDF Triple Language," W3C Team Submission, Jan. 14, 2008, Retrieved from the Internet URL: https://www.w3.org/TeamSubmission/2008/SUBM-turtle-20080114/ [retrieved Mar. 7, 2019].

Beckett, D., Broekstra, J., "SPARQL Query Results XML Format," W3C Recommendation, Jan. 15, 2008, Retrieved from the Internet URL: https://www.w3.org/TR/2008/REC-rdf-sparql/XMLres-20080115/ [retrieved Mar. 7, 2019].

Beckett, Dave, "RDF/XML Syntax Specification (Revised)," W3C Recommendation, Feb. 10, 2004, Retrieved from the Internet; URL: https://www.w3.org/TR/2004/REC-rdf-syntax-grammar-20040210/ [retrieved Mar. 7, 2019].

Berners-Lee, Tim, "Notation 3," 2006, Retrieved from the Internet; URL: https://www.w3.org/DesignIssues/Notation3.html [retrieved on Mar. 7, 2019].

Berners-Lee, Tim, "Linked Data," 2009, Retrieved from the Internet; URL: https://www.w3.org/DesignIssues/LinkedData.html [retrieved on Mar. 7, 2019].

Boutros et al., "Computerized Tools to Develop and Manage Data-Driven Projects Collaboratively via a Networked Computing Platform and Collaborative Datasets," U.S. Appl. No. 15/985,702, filed May 22, 2018.

Boutros et al., "Computerized Tools to Facilitate Data Project Development via Data Access Layering Logic in a Networked Computing Platform Including Collaborative Datasets," U.S. Appl. No. 15/985,704, filed May 22, 2018.

(56) References Cited

OTHER PUBLICATIONS

Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet; URL: https://www.w3.org/TR/2004/REC-rdf-schema-2004/0210/[retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Dec. 20, 2021 for U.S. Appl. No. 16/457,759.
Bullock, Joshua, Non-Final Office Action dated Dec. 7, 2021 for U.S. Appl. No. 16/457,750.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Bullock, Joshua, Notice of Allowance and Fee(s) Due dated Dec. 22, 2021 for U.S. Appl. No. 16/395,049.
Bullock, Joshua, Notice of Allowance and Fee(s) Due dated Feb. 23, 2022 for U.S. Appl. No. 16/457,750.
Caiado, Antonio J., Non-Final Office Action dated Sep. 16, 2022 for U.S. Appl. No. 17/365,214.
Clark, K., Feigenbaum, L., Torres, E., "SPARQL Protocol for RDF," W3C Recommendation, Jan. 15, 2008, Retrieved from the Internet; URL: https://www.w3.org/TR/2008/REC-rdf-sparql-protocol-20080115/ [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet; URL: https://www.w3.org/TR/2004/REC-owl-ref-20040210/ [retrieved Mar. 7, 2019].
Doung, Hien, Non-Final Office Action dated Dec. 9, 2020 for U.S. Appl. No. 16/899,544.
Duong, Hien Luongvan, Non-Final Office Action dated May 5, 2022 for U.S. Appl. No. 17/185,917.
Duong, Hien, Notice of Allowance and Fee(s) Due dated Oct. 27, 2022 for U.S. Appl. No. 17/185,917.
Dwivedi, Mahesh H., Non-Final Office Action dated Jan. 30, 2020 for U.S. Appl. No. 15/454,955.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Autocompletion of Queries With Data Object Names and Data Profiles."
Garay, Peter, Examination Report No. 1 for Standard Patent Application for Australia Patent Application No. 2017282656 dated Jul. 21, 2021, Intellectual Property Office of Australia.
Garcia-Molina, H., Ullman, J., Widom, J., Database Systems: The Complete Book. Editorial Pearson Prentice Hall. Second Edition. Published Jan. 11, 2011. (Year: 2011).
Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from https://siliconangle.com/2020/03/24/neo4j-connector-integrates-graph-data-business-intelligence-tools/ on Mar. 25, 2020.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet URL: https://www.w3.org/TR/2004/REC-rdf-testcases-20040210/ [retrieved Mar. 7, 2019].
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.

(56) References Cited

OTHER PUBLICATIONS

Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet; URL: https://www.w3.org/TR/2004/REC-rdf-mt-20040210/ [retrieved Mar. 7, 2019].
Heflin, J., "OWL Web Ontology Language Use Cases and Requirements," W3C Recommendation, Feb. 10, 2004, Retrieved from the Internet; URL: https://www.w3.org/TR/2004/REC-webnot-req-20040210 [retrieved Mar. 7, 2019].
Henry, Jerome William, U.S. Appl. No. 61/515,305, filed Aug. 4, 2011 entitled, "Apparatus and Method for Supplying Search Results With a Knowledge Card."
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Hoang, Hau Hai, Notice of Allowance and Fee(s) Due dated Aug. 19, 2021 for U.S. Appl. No. 16/697,132.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Hu, Xiaoqin, Non-Final Office Action dated Jul. 30, 2021 for U.S. Appl. No. 16/732,261.
Hu, Xiaoqin, Non-Final Office Action dated Sep. 2, 2021 for U.S. Appl. No. 16/732,263.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation via Distributed Computer Networks," U.S. Appl. No. 16/120,057, filed Aug. 31, 2018.
Jacob et al., "Collaborative Dataset Consolidation via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/271,263, filed Feb. 8, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Kim, Harry C., Notification of Transmittal of the International Search Report and the Written Opinion of the International Searching Authority, or the Declaration, dated Sep. 28, 2021 for International Application No. PCT/US2021/036880.
Klyne, G., Carroll, J., "Resource Description Framework (RDF): Concepts and Abstract Syntax," W3C Recommendation, Feb. 10, 2004, Retrieved from the Internet; URL: https://www.w3.org/TR/2004/REC-rdf-concepts-20040210 [retrieved Mar. 7, 2019].
Konda et al., Magellan: Toward Building Entity Matching Management Systems over Data Science Stacks, Proceedings of the VLDB Endowment, vol. 9, No. 13, (2016), pp. 1581-1584; URL: http://cpcp.wisc.edu/images/resources/magellan-vldb16.pdf, Date retrieved: Aug. 30, 2021.
Konda, Pradap, Magellan: Toward Building Entity Matching Management Systems, Presentation dated Feb. 27, 2018.
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet URL: http://xlwrap.sourceforge.net [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet; URL: https://www.w3.org/TR/2004/REC-rdf-primer-20040210/ [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet; URL: https://www.w3.org/TR/2004/REC-owl-features-20040210/ [retrieved Mar. 7, 2019].
Mian, Muhammad U., Notice of Allowance and Fee(s) Due dated Jun. 6, 2022 for U.S. Appl. No. 17/246,359.
Mian, Umar, Non-Final Office Action dated Apr. 8, 2022 for U.S. Appl. No. 17/246,359.
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet; URL: https://www.ncbi.nlm.nih.gov/ [retrieved Mar. 7, 2019].
Nguyen, Bao-Yen Thi, Restriction Requirement dated Jun. 29, 2021 for Design U.S. Appl. No. 29/648,466.
Nguyen, Kim T., Non-Final Office Action dated Apr. 25, 2022 for U.S. Appl. No. 17/163,287.
Nguyen, Kim T., Non-Final Office Action dated Aug. 31, 2021 for U.S. Appl. No. 16/899,549.
Nguyen, Kim T., Non-Final Office Action dated Aug. 31, 2022 for U.S. Appl. No. 17/332,354.

(56) References Cited

OTHER PUBLICATIONS

Nguyen, Kim T., Non-Final Office Action dated Aug. 31, 2022 for U.S. Appl. No. 17/333,914.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 14, 2018 for U.S. Appl. No. 15/186,514.
Nguyen, Kim T., Non-Final Office Action dated Jun. 7, 2021 for U.S. Appl. No. 16/457,766.
Nguyen, Kim T., Non-Final Office Action dated Mar. 20, 2019 for U.S. Appl. No. 15/454,923.
Nguyen, Kim T., Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Nov. 21, 2022 for U.S. Appl. No. 17/332,354.
Nguyen, Kim T., Notice of Allowance and Fee(s) Due dated Apr. 14, 2022 for U.S. Appl. No. 17/037,005.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Sep. 28, 2022 for U.S. Appl. No. 17/163,287.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Noy et al., "Tracking Changes During Ontology Evolution." International Semantic Web Conference. Springer, Berlin, Heidelberg, 2004 (Year: 2004).
Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "OWL Web Ontology Language Semantics and Abstract Syntax," W3C Recommendation, Feb. 10, 2004, Retrieved from the Internet; URL: https://www.w3.org/TR/2004/REC-owl-semantics-20040210 [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet; URL: https://www.w3.org/TR/2008/REC-rdf-sparql-query-20080115/ [retrieved Mar. 7, 2019].
Raab, Christopher J., Non-Final Office Action dated Jul. 24, 2020 for U.S. Appl. No. 16/271,687.
Raab, Christopher J., Non-Final Office Action dated Jun. 28, 2018 for U.S. Appl. No. 15/186,520.
Raab, Christopher J., Non-Final Office Action dated Oct. 16, 2020 for U.S. Appl. No. 16/287,967.
Raab, Christopher J., Notice of Allowance and Fee(s) Due and Notice of Allowability for U.S. Appl. No. 15/186,520, dated Jan. 2, 2019.
Rachapalli et al., "RETRO: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
RDB2RDF Working Group Charter, Sep. 2009, Retrieved from the Internet; URL: https://www.w3.org/2009/08/Ydb2rdf-charter [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed with the Receiving Office of the USPTO dated Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, URL: http://www.w3.org/2005/Incubator/rdb2rdf/RDB2RDF_Survey_Report_01082009.pdf Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.
Smith, M., Welty, C., McGuiness, D., "OWL Web Ontology Language Guide," W3C Recommendation, Feb. 10, 2004, Retrieved from the Internet; URL: https://www.w3.org/TR/2004/REC-owl-guide-20040210/ [retrieved Mar. 7, 2019].
Smith, T.F., Waterman, M.S., "Identification of Common Molecular Subsequences," J. Mol. Biol. 147, 195-197 (1981).
Spieler, William, Advisory Action dated Nov. 22, 2021 for U.S. Appl. No. 16/435,196.
Spieler, William, Final Office Action dated Mar. 15, 2021 for U.S. Appl. No. 16/435,196.
Spieler, William, Non-Final Office Action dated Dec. 31, 2020 for U.S. Appl. No. 16/435,196.
Spieler, William, Non-Final Office Action dated Feb. 25, 2021 for U.S. Appl. No. 16/558,076.
Spieler, William, Non-Final Office Action dated Jul. 9, 2021 for U.S. Appl. No. 16/435,196.
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.

(56) References Cited

OTHER PUBLICATIONS

Uddin, MD I, Non-Final Office Action dated May 13, 2021 for U.S. Appl. No. 16/404,113.
Uddin, MD I., Final Office Action dated Jan. 1, 2021 for U.S. Appl. No. 16/404,113.
Uddin, MD I., Non-Final Office Action dated Oct. 6, 2020 for U.S. Appl. No. 16/404,113.
Ultrawrap Mapper, U.S. Appl. No. 62/169,268, filed Jun. 1, 2015 (Expired).
Vu, Bai Duc, Notice of Allowance and Fee(s) Due dated Aug. 22, 2022 for U.S. Appl. No. 16/899,551.
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Yen, Syling, Final Office Action dated Apr. 10, 2019 for U.S. Appl. No. 15/186,519.
Yen, Syling, Final Office Action dated Oct. 25, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Yotova, Polina, European Patent Office Examination Report, Communication Pursuant to Article 94(3) EPC for European Patent Application No. 17815970.3 dated Oct. 5, 2021.
Yotova, Polina, Supplementary European Search Report and Examiner Search Opinion for European Patent Application No. 17815970.3, dated Feb. 21, 2020.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees and, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Jacob et al., "Dataset Analysis and Dataset Attribute Inferencing to Form Collaborative Datasets," U.S. Appl. No. 16/292,120, filed Mar. 4, 2019.
Jacob et al., "Management of Collaborative Datasets via Distributed Computer Networks," U.S. Appl. No. 16/271,687, filed Feb. 8, 2019.
Jacob et al., "Management of Collaborative Datasets via Distributed Computer Networks," U.S. Appl. No. 16/292,135, filed Mar. 4, 2019.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Nguyen, Kim T., Notice of Allowance and Fee(s) Due dated Aug. 3, 2021 for U.S. Appl. No. 16/457,766.
Nguyen, Kim T., Notice of Allowance and Fee(s) Due dated Jul. 11, 2022 for U.S. Appl. No. 17/332,368.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.
Nguyen, Kim T., Notice of Allowance and Fee(s) Due dated Mar. 31, 2021 for U.S. Appl. No. 15/985,705.
Vy, Hung T., Non-Final Office Action for U.S. Appl. No. 15/273,930 dated Dec. 20, 2017.
Willis, Amanda Lynn, Final Office Action dated Apr. 18, 2022 for U.S. Appl. No. 16/899,547.
Willis, Amanda Lynn, Non-Final Office Action dated Feb. 8, 2022 for U.S. Appl. No. 16/899,547.
Willis, Amanda Lynn, Non-Final Office Action dated Sep. 8, 2022 for U.S. Appl. No. 16/899,547.
Woo, Isaac M., Non-Final Office Action dated Jul. 28, 2022 for U.S. Appl. No. 17/004,570.
Woo, Isaac M., Non-Final Office Action dated May 5, 2020 for U.S. Appl. No. 16/137,292.

* cited by examiner

CORRELATING PARALLELIZED DATA FROM DISPARATE DATA SOURCES TO AGGREGATE GRAPH DATA PORTIONS TO PREDICTIVELY IDENTIFY ENTITY DATA

CROSS-REFERENCE TO APPLICATIONS

This nonprovisional application is a continuation-in-part application of co-pending U.S. patent application Ser. No. 17/037,005, filed Sep. 29, 2020, and entitled "COLLABORATIVE DATASET CONSOLIDATION VIA DISTRIBUTED COMPUTER NETWORKS;'" U.S. patent application Ser. No. 17/037,005 is a continuation application of U.S. patent application Ser. No. 16/120,057, filed Aug. 31, 2018, now U.S. Pat. No. 10,853,376, and entitled, "COLLABORATIVE DATASET CONSOLIDATION VIA DISTRIBUTED COMPUTER NETWORKS;" U.S. patent application Ser. No. 16/120,057 is a continuation application of U.S. patent application Ser. No. 15/186,514, filed Jun. 19, 2016, now U.S. Pat. No. 10,102,258 and entitled, "COLLABORATIVE DATASET CONSOLIDATION VIA DISTRIBUTED COMPUTER NETWORKS;" THIS nonprovisional application is a —Continuation-In-Part—application of co-pending U.S. patent application Ser. No. 16/457,766 filed Jun. 28, 2019, and entitled "COMPUTERIZED TOOLS TO DISCOVER, FORM, AND ANALYZE DATASET INTERRELATIONS AMONG A SYSTEM OF NETWORKED COLLABORATIVE DATASETS;'" U.S. patent application Ser. No. 16/457,766 is a continuation of U.S. patent application Ser. No. 15/454,923, filed on Mar. 9, 2017, now U.S. Pat. No. 10,353,911, and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 15/454,923 is a continuation-in-part application of U.S. patent application Ser. No. 15/186,514, filed on Jun. 19, 2016, now U.S. Pat. No. 10,102,258 and titled "COLLABORATIVE DATASET CONSOLIDATION VIA DISTRIBUTED COMPUTER NETWORKS;" THIS nonprovisional application is a —Continuation-In-Part—application of co-pending U.S. patent application Ser. No. 17/332,354 filed May 27, 2021 and titled, "EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS;" U.S. patent application Ser. No. 17/332,354 is a continuation application of U.S. patent application Ser. No. 16/036,834, filed Jul. 16, 2018, now U.S. Pat. No. 11,042,560, and titled, "EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS;" U.S. patent application Ser. No. 16/036,834 is a continuation-in-part application of U.S. patent application Ser. No. 15/186,514, filed on Jun. 19, 2016, now U.S. Pat. No. 10,102,258 and titled "COLLABORATIVE DATASET CONSOLIDATION VIA DISTRIBUTED COMPUTER NETWORKS;" U.S. patent application Ser. No. 16/036,834 is also a continuation-in-part application of U.S. patent application Ser. No. 15/186,516, filed on Jun. 19, 2016, now U.S. Pat. No. 10,452,677 and titled "DATASET ANALYSIS AND DATASET ATTRIBUTE INFERENCING TO FORM COLLABORATIVE DATASETS;" U.S. patent application Ser. No. 16/036,834 is also a continuation-in-part application of U.S. patent application Ser. No. 15/454,923, filed on Mar. 9, 2017, now U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,834 is also a continuation-in-part application of U.S. patent application Ser. No. 15/926,999, filed on Mar. 20, 2018, now U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 16/036,834 is also a continuation-in-part application of U.S. patent application Ser. No. 15/927,004, filed on Mar. 20, 2018, now U.S. Pat. No. 11,036,716 and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser. No. 16/036,834 is also a continuation-in-part application of U.S. patent application Ser. No. 15/439,908, filed on Feb. 22, 2017, now U.S. Pat. No. 10,452,975 and titled "PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION;" U.S. patent application Ser. No. 16/036,834 is also a continuation-in-part application of U.S. patent application Ser. No. 15/985,702, filed on May 22, 2018, now U.S. Pat. No. 11,068,475, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 16/036,834 is also a continuation-in-part application of U.S. patent application Ser. No. 15/985,704, filed on May 22, 2018, now U.S. Pat. No. 11,068,847, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS;" U.S. patent application Ser. No. 16/036,834 is also a continuation-in-part application of U.S. patent application Ser. No. 15/985,705, filed on May 22, 2018, now U.S. Pat. No. 11,086,896, and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM;" U.S. patent application Ser. No. 17/332,354 is also a continuation of U.S. patent application Ser. No. 16/036,836, filed Jul. 16, 2018, now U.S. Pat. No. 11,042,556, and titled, "LOCALIZED LINK FORMATION TO PERFORM IMPLICITLY FEDERATED QUERIES USING EXTENDED COMPUTERIZED QUERY LANGUAGE SYNTAX;" U.S. patent application Ser. No. 16/036,836 is a continuation-in-part application of U.S. patent application Ser. No. 15/186,514, filed on Jun. 19, 2016, now U.S. Pat. No. 10,102,258 and titled "COLLABORATIVE DATASET CONSOLIDATION VIA DISTRIBUTED COMPUTER NETWORKS;" U.S. patent application Ser. No. 16/036,836 is also a continuation-in-part application of U.S. patent application Ser. No. 15/186,516, filed on Jun. 19, 2016, now U.S. Pat. No. 10,452,677 and titled "DATASET ANALYSIS AND DATASET ATTRIBUTE INFERENCING TO FORM COLLABORATIVE DATASETS;" U.S. patent application Ser. No. 16/036,836 is also a continuation-in-part application of U.S. patent application Ser. No. 15/454,923, filed on Mar. 9, 2017, now U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,836 is also a continuation-in-part application of U.S. patent application Ser. No. 15/926,999, filed on Mar. 20, 2018, now U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 16/036,836 is also a continuation-in-part application of U.S. patent application Ser. No. 15/927,004, filed on Mar. 20, 2018, now U.S. Pat. No. 11,036,716, and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser. No. 16/036,836 is also a continuation-in-part application of U.S. patent application Ser. No. 15/439,908, filed on Feb. 22, 2017, now U.S. Pat. No. 10,452,975 and titled "PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION;" U.S. patent application Ser. No. 16/036,836 is also a continuation-in-part application of U.S. patent application Ser. No. 15/985,702, filed on May 22, 2018, now U.S. Pat. No. 11,068,475, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 16/036,836 is also a continuation-in-part application of U.S. patent application Ser. No. 15/985,704, filed on May 22, 2018, now U.S. Pat. No. 11,068,847, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS;" U.S. patent application Ser. No. 16/036,836 is also a continuation-in-part application of U.S. patent application Ser. No. 15/985,705, filed on May 22, 2018, now U.S. Pat. No. 11,086,896, and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM;" THIS nonprovisional application is a —Continuation-In-Part—application of co-pending U.S. patent application Ser. No. 17/333,914 filed May 28, 2021 and titled, "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 17/333,914 is a continuation-in-part application of U.S. patent application Ser. No. 15/186,514, filed on Jun. 19, 2016, now U.S. Pat. No. 10,102,258, and titled "COLLABORATIVE DATASET CONSOLIDATION VIA DISTRIBUTED COMPUTER NETWORKS," U.S. patent application Ser. No. 17/333,914 is a continuation-in-part application of U.S. patent application Ser. No. 15/186,516, filed on Jun. 19, 2016, now U.S. Pat. No. 10,452,677, and titled "DATASET ANALYSIS AND DATASET ATTRIBUTE INFERENCING TO FORM COLLABORATIVE DATASETS," U.S. patent application Ser. No. 17/333,914 is a continuation-in-part application of U.S. patent application Ser. No. 15/454,923, filed on Mar. 9, 2017, now U.S. Pat. No. 10,353,911, and titled "COMPUTERIZED TOOLS TO DISCOVER, FORM, AND ANALYZE DATASET INTERRELATIONS AMONG A SYSTEM OF NETWORKED COLLABORATIVE DATASETS," U.S. patent application Ser. No. 17/333,914 is a continuation-in-part application of U.S. patent application Ser. No. 15/926,999, filed on Mar. 20, 2018, now U.S. Pat. No. 11,016,931, and titled "DATA INGESTION TO GENERATE LAYERED DATASET INTERRELATIONS TO FORM A SYSTEM OF NETWORKED COLLABORATIVE DATASETS," and U.S. patent application Ser. No. 17/333,914 is a continuation-in-part application of U.S. patent application Ser. No. 15/927,004, filed on Mar. 20, 2018, now U.S. Pat. No. 11,036,716, titled "LAYERED DATA GENERATION AND DATA REMEDIATION TO FACILITATE FORMATION OF INTERRELATED DATA IN A SYSTEM OF NETWORKED COLLABORATIVE DATASETS;" THIS nonprovisional application is a —Continuation-In-Part—application of co-pending U.S. patent application Ser. No. 17/004,570 filed Aug. 27, 2020 and titled, "MATCHING SUBSETS OF TABULAR DATA ARRANGEMENTS TO SUBSETS OF GRAPHICAL DATA ARRANGEMENTS AT INGESTION INTO DATA-DRIVEN COLLABORATIVE DATASETS;" U.S. patent application Ser. No. 17/004,570 is a continuation application of U.S. patent application Ser. No. 16/137,292 filed on Sep. 20, 2018, now U.S. Pat. No. 10,824,637, and titled, "Matching Subsets of Tabular Data Arrangements to Subsets of Graphical Data Arrangements at Ingestion into Data Driven Collaborative Datasets," U.S. patent application Ser. No. 16/137,292 is a continuation-in-part application of U.S. patent application Ser. No. 15/454,923, filed on Mar. 9, 2017, now U.S. Pat. No. 10,353,911, and titled "Computerized Tools To Discover, Form, And Analyze Dataset Interrelations Among A System Of Networked Collaborative Datasets," U.S. patent application Ser. No. 16/137,292 is also a continuation application of U.S. patent application Ser. No. 15/926,999, filed on Mar. 20, 2018, now U.S. Pat. No. 11,016,931, and titled "Data Ingestion To Generate Layered Dataset Interrelations To Form A System Of Networked Collaborative Datasets," U.S. patent application Ser. No. 16/137,292 is also a continuation application of U.S. patent application Ser. No. 15/927,004, filed on Mar. 20, 2018, now U.S. Pat. No. 11,036,716, and titled "Layered Data Generation And Data Remediation To Facilitate Formation Of Interrelated Data In A System Of Networked Collaborative Datasets," U.S. patent application Ser. No. 16/137,292 is also a continuation application of U.S. patent application Ser. No. 15/985,702, filed on May 22, 2018, now U.S. Pat. No. 11,068,475, and titled "Computerized Tools To Develop And Manage Data-Driven Projects Collaboratively Via A Networked Computing Platform And Collaborative Datasets," U.S. patent application of Ser. No. 16/137,292 is also a continuation application of U.S. patent application Ser. No. 15/985,704, filed on May 22, 2018, now U.S. Pat. No. 11,068,847, and titled "Computerized Tools To Facilitate Data Project Development Via Data Access Layering Logic In A Networked Computing Platform Including Collaborative Datasets;" all of which are herein incorporated by reference in their entirety for all purposes.

FIELD

Various embodiments relate generally to data science and data analysis, computer software and systems, and data-driven control systems and algorithms based on graph-based data arrangements, among other things, and, more specifically, to a computing platform configured to receive or analyze datasets in parallel by implementing, for example, parallel computing processor systems to correlate subsets of parallelized data from disparately-formatted data sources to identify entity data and to aggregate graph data portions, among other things.

BACKGROUND

Advances in computing hardware and software have ignited exponential growth in the generation of vast amounts of data due to increased computations and analyses in numerous areas, such as in the various scientific and engineering disciplines. Also, advances in conventional data storage technologies provide an ability to store an increasing amounts of generated data. Moreover, different computing platforms and systems, different database technologies, and different data formats give rise to "data silos" that inherently segregate and isolate datasets.

While conventional approaches are functional, various approaches are not well-suited to significantly overcome the difficulties of data silos. Organizations, including enterprises, continue strive to understand, manage, and productively use large amounts of enterprise data. For example, consumers of enterprise organizations have different levels of skill and experience in using analytic data tools. Data scientists typically create complex data models using sophisticated analysis application tools, whereas other individuals, such as executives, marketing personnel, product managers, etc., have varying levels of skill, roles, and responsibilities in an organization. The disparities in various analytic data tools, reporting tools, visualization tools, etc., continue to frustrate efforts to improve interoperability and usage of large amounts of data.

Further, various data management and analysis applications, such as query programming language applications and data analytic applications, may not be compatible for use in a distributed data architecture, such as a "cloud"-based computing platform. Hence, data practitioners generally may be required to intervene manually to apply derived formulaic data models to datasets, such as using local computing resources, which requires a burden to update and maintain data terms and definitions as well as storing relatively large amounts of data relying on a particular data format and database schema (e.g., relying on relational databases and relational table data formats).

Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
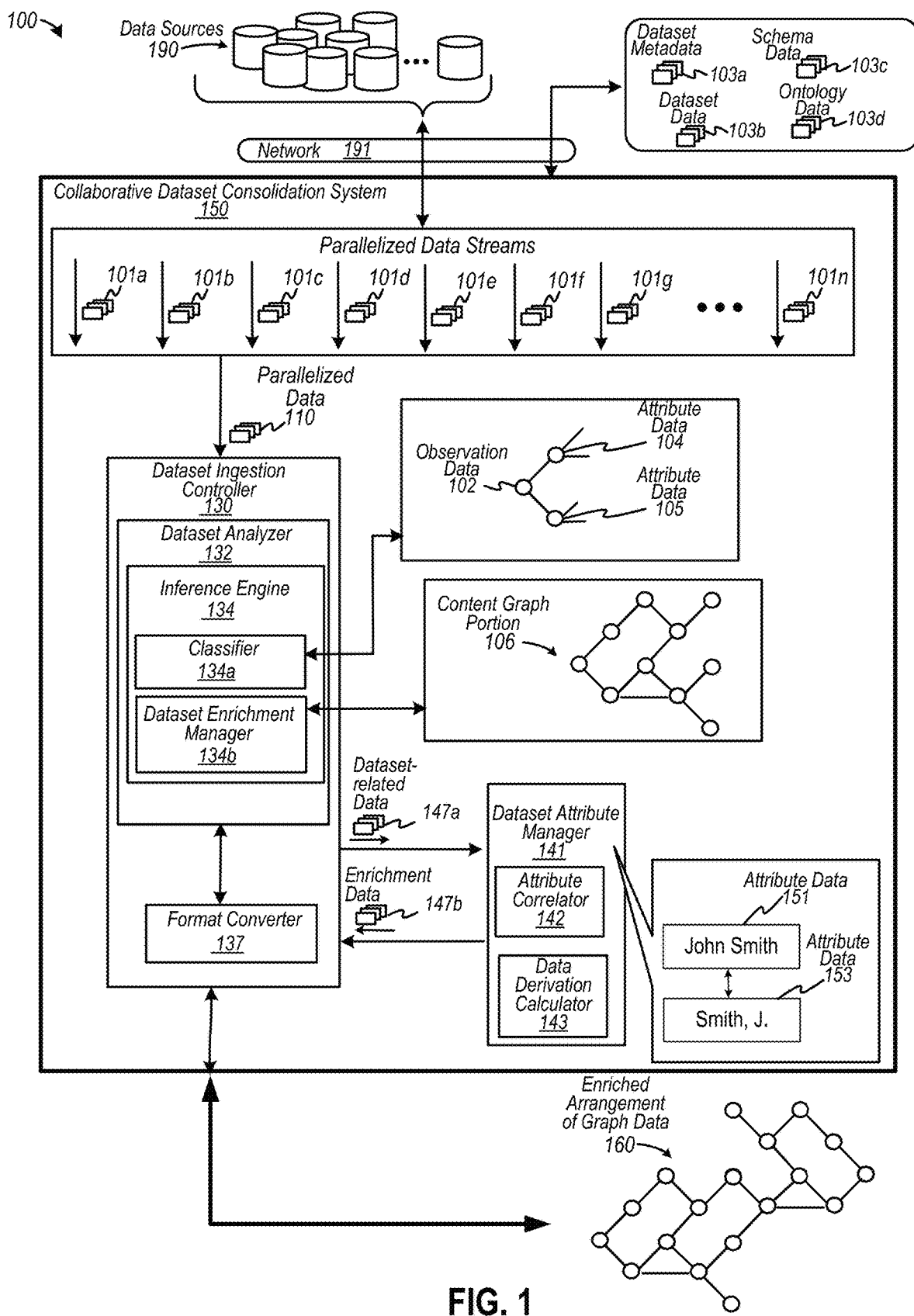
FIG. 1 is a diagram depicting a computing system configured to correlate portions of parallelized data to identify entity data predictively, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture implementing hardware or software, or both, using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions in association with a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures or memory configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS"). Another example of cloud computing services include the Google® cloud platform that may implement a publisher-subscriber messaging service (e.g., Google® pub/sub architecture). Yet in another example, cloud computing and messaging services may include Apache Kafka, Apache Spark, and any other Apache software application and platforms, which are developed and maintained by Apache Software Foundation of Wilmington, Del., U.S.A.

Further, references to databases, data structures, memory, or any type of data storage facility may include any embodiment as a local, remote, distributed, networked, cloud-based, or combined implementation thereof. For example, social networks and social media (e.g., "social media") using different types of devices may generate (i.e., in the form of posts which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, as electronic messages for use on social networks, social media, and social applications (e.g., "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., and others, without limitation or restriction. In various embodiments, the term "content" may refer to, for example, one or more of executable instructions (e.g., of an application, a program, or any other code compatible with a programming language), textual data, image data, video data, audio data, or any other data.

In some examples, data may be formatted and transmitted via electronic messaging channels (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("TM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In some examples, systems, software, platforms, and computing clouds, or any combination thereof, may be implemented to facilitate online distribution of subsets of units of any data, content, postings, electronic messages, and the like. In some cases, units of content, electronic postings, electronic messages, and the like may originate at social networks, social media, and social applications, or any other source of content.

FIG. 1 is a diagram depicting a computing system configured to correlate portions of parallelized data to identify entity data predictively, according to some embodiments. Diagram 100 depicts an example of a networked (e.g., cloud-based) computing system, such as collaborative dataset consolidation system 150, that may be configured to access any amount of raw data via a network 191 from disparate data sources 190 to (1) analyze the data, to (2) deduplicate associated subsets of data through dataset consolidation, to (3) format data in a graph-based data format, to (4) resolve predictively identities of entities using data representations of objects and relationships among any number of entities, and to (5) provide any other number of functionalities. Further, collaborative dataset consolidation system 150 may be configured to generate and incrementally modify an arrangement of graph data using enriched data. In the example shown, an arrangement of graph data may include an enriched arrangement of graph data 160. In some examples, an arrangement of graph data, such as enriched arrangement of graph data 160, may be configured to constitute a "knowledge graph."

Data sources 190, whether stored locally or remotely, may be accessed to provide any type of data in any format, such as structured data (e.g., data stored as data tables in relational databases accessible via, for example, SQL or other structured database languages), semi-structured data (e.g., XML-formatted data, metadata, spreadsheet data, etc.), and unstructured data (e.g., PDF documents, GitHub™ Jupyter Notebook data, text document data, email document data, website data, etc.).

In the example shown, collaborative dataset consolidation system 150 may be configured to include any combination of hardware and software to analyze, deduplicate, format, and resolve data representing identities of entities, the data being received from data sources 190 as parallelized data 110. In at least one instance, collaborative dataset consolidation system 150 may be configured to process data from data resources 190 in parallel (or substantially in parallel), for example, in real-time or near real-time. Collaborative dataset consolidation system 150 may include logic as hardware (e.g., multiple processors such as more than 200 to 1,600 core processors) and software, or any combination thereof, that may be configured to "massively parallel process" parallelized data 110 to analyze, deduplicate, format, and/or resolve data representing identities of entities as each of parallelized data streams 101a to 101n. In a non-limiting example, consider that collaborative dataset consolidation system 150 may be configured to access data with more than one thousand data sources 190 to identify 50 billion or more subsets of observation data (or units of observation data) during a time interval (e.g., 24 hours or less). Parallelized processing of data (e.g., raw data) from data sources 190 facilitates rapid and expeditious deduplication and consolidation of data to form units of observation data with which to resolve to identify unique entities, according to some examples. In one example, logic configured to implement dataset ingestion controller 130 and dataset attribute manager 141 may be replicated (not shown) to process each of parallelized data streams 101a to 101n in parallel, or substantially in parallel.

In the example shown, collaborative dataset consolidation system 150 may include a dataset ingestion controller 130 configured to remediate (e.g., "clean" and "prepare") parallelized data 110 prior to conversion into another data format (e.g., a graph data structure) that may be stored locally or remotely such as a graph data node referring to an external data source, such as one of data sources 190. As shown, dataset ingestion controller 130 may also include a dataset analyzer 132 and a format converter 137. Also shown, dataset analyzer 130 may include an inference engine 134, which may include a data classifier 134a and a data enhancement manager 134b. Further to diagram 100, collaborative dataset consolidation system 150 is shown also to include a dataset attribute manager 141, which includes an attribute correlator 142 and a data derivation calculator 143. Dataset ingestion controller 130 and dataset attribute manager 141 may be communicatively coupled to exchange dataset-related data 147a and enrichment data 147b, whereby any of dataset ingestion controller 130 and dataset attribute manager 141 may exchange data from a number of sources (e.g., external data sources) that may include dataset metadata 103a (e.g., descriptor data or information specifying dataset attributes), dataset data 103b (e.g., reference data stored locally or remotely to access data in any local or remote data storage, such as data in data sources 190), schema data 103c (e.g., sources, such as schema.org, that may provide various types and vocabularies, glossaries, data dictionaries, and the like), and ontology data 103d from any suitable ontology and any other suitable types of data sources.

Diagram 100 depicts an example of a classifier 124a configured to classify any portion of parallelized data stream 101a to 101n as including a unit of observation data 102 associated with one or more attributes and data values, such as attribute data 104 and attribute 105. Observation data, or a unit thereof, can be data that may be classified as being associated with an entity, a concept, a topic, or a classification of data (e.g., a "class" of data), such as a "person" associated with attributes including a name, an address, etc., or a "product" associated with attributes including a product name, a manufacturer, a stock-keeping unit ("SKU"), etc., or a "service" associated with attributes including a name of purveyor of such services, etc., or any other entity. As an example, an "observation" or a unit of observation data may be refer to a data record that may include data representing attributes identifying a name, an address, a phone number, an email address, a customer number, a familial relationship, a gender, or any other attribute or characteristic of an object or individual entity. A unit of observation data 102 may be correlatable to (or matched to) any number of attributes, such as attributes 104 and 105 as well as other attributes and/or data values.

According to some examples, data representing a unit of observation data 102 may be computed to be associated with a hash value referring to a content-addressed node of a graph data arrangement, whereby similar or equivalent hash values may be implemented to consolidate (e.g., collapse, integrate, or deduplicate) multiple data representations of entities into graph data representing an entity. In some cases, observation data 102 may be referred to as an "observation fingerprint" (e.g., an electronically digital fingerprint, or a portion thereof) associated with an entity, whereby each grouping of observation data 102 and attributes 104 and 105 may be considered as a subset of data representing an entity—that when aggregated or clustered with other equivalent observation fingerprints—provides enriched graph data that may be used to describe or identify a particular entity (e.g., uniquely identifying a specific person). Note that the term "attribute" may refer to, or may interchangeable with, the term "property."

Dataset ingestion controller 130 or dataset enrichment manager 134b may be configured to generate a content graph 106 (or a portion thereof) based on one or more subsets of observation data 102 and attribute data 104 and 105. In one example, content graph 106 may include at least one node representing observation data 102 and one or more other nodes each representing a data value (e.g., as attributes 104 and 105, or any other attribute or data value). In some examples, dataset enrichment manager 134b may be configured to correlate or predictively match groupings of content graph portions 106 to deduplicate redundant data and to consolidate attribute data to comprehensively generate enriched graph data that represents an entity. Hence, dataset enrichment manager 134b may be configured to consolidate datasets and portions thereof.

Further, any of dataset attribute manager 141 and attribute correlator 142 may be configured to correlate attribute data 104 and 105 of observation data 102 to correlate or match with other subsets of attribute data to form correlated subsets of parallelized data 110, each of which may be used to aggregate or cluster groups of observation data 102 to generate content graph 106 to characterize and identify an entity. Parallelized data 110 or observation data 102 with attribute data 104 and 105 may be transmitted to dataset attribute manager 141. As shown, dataset attribute manager 141 and attribute correlator 142 may be configured to correlate a first data value as attribute data 151 ("John Smith") to a second data value as attribute data 153 ("Smith, J."). Correlated attribute data 151 and 153 may be transmitted as enrichment data 147b to facilitate aggregating or clustering of content graph portions 106 at dataset enrichment manager 134b to form or modify at least a portion of enriched arrangement of graph data 160. Dataset attribute manager 141 and attribute correlator 142 may be configured to electronically interact to aggregate or cluster content graph portions 106 to identify an individual entity (e.g., a person or a product), and may be further configured to aggregate or cluster aggregated content graph portions 106 to identify a hierarchical entity to which individual entities may be associated (e.g., a household or a manufacturer). In some examples, dataset attribute manager 141 and attribute correlator 142 may be configured to electronically interact to correlate or match data representing observation fingerprints to derive a calculated identify of an entity from relatively large amounts (e.g., 50 Billion or more) of units of observation data 102.

According to some examples, dataset analyzer 132 and any of its components, including inference engine 134, may be configured to analyze datasets of parallelized data 110 to detect or determine whether ingested data has an anomaly relating to data (e.g., improper or unexpected data formats, types or values) or to a structure of a data arrangement in which the data is disposed. For example, inference engine 134 may be configured to analyze parallelized data 110 to identify tentative anomalies and to determine (e.g., infer or predict) one or more corrective actions. In some cases, inference engine 134 may predict a most-likely solution relative to other solutions for automatic resolution to clean and prepare data. In some examples, dataset analyzer 132 may be configured to correct an anomaly (e.g., to correct or confirm data, such as data that might refer to a U.S. state name, such as "Texas," rather than "TX"). Dataset analyzer 132 and any of its components may be configured to perform an action based on any of a number of statistical computations, including Bayesian techniques, linear regression, natural language processing ("NLP") techniques, machine-learning techniques, deep-learning techniques, etc. In some other examples, dataset analyzer 132 may be configured to identify and correct or quarantine invalid data values or outlier data values (e.g., out-of-range data values). Therefore, dataset analyzer 132 may facilitate corrections to observation data 102 or content graph data 106 "in-situ" or "in-line" (e.g., in real time or near real time) to enhance accuracy of atomized dataset generation (e.g., including triples) during the dataset ingestion and/or graph formation processes to form graph arrangement 160. In some cases, collaborative dataset consolidation system 150 may be configured to construct a repair graph including invalid or quarantined data to remediate the anomalous data for use in graph arrangement 160.

Subsequent or in parallel to performing corrective actions to remediate automatically issues related to datasets and data embodied in parallelized data 100, classifier 134a may be configured to identify and classify data as observation data 102, which may be linked to attribute data 104 and 105. Data enrichment manager 134b may be configured to generate and aggregate content graph portions 106 to identify an entity. Format converter 137 may be configured to convert any portion of parallelized data from data source 190 to graph-based data as observation data 102 and content graph data 106 at any time during ingestion, analyzation, identification, and deduplication of data. Format converter 137 may be configured to generate other graph-based data, such as ancillary data or descriptor data (e.g., metadata) that may describe other attributes associated with each unit of observation data 102. Ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement.

In various examples, attribute correlator 142 may be configured to correlate inferred or implicit (as well as explicit) attributes with a dataset having attributes 151 and 153 to other attributes of other observation data 102, which may be implemented to join, aggregate, or cluster data to enrich an ingested dataset to form graph data 160. For example, attribute correlator 1763 can detect patterns in datasets in parallelized data streams 101a to 101n to correlate or match attributes to identify subsets of observation data 102 that may be correlatable to an identity of an entity. Attribute correlator 142 may be configured to analyze the data to detect patterns or data classifications that may resolve an issue, by "learning" or probabilistically predicting a dataset attribute through the use of Bayesian networks, clustering analysis, as well as other known machine learning techniques, deep-learning techniques, and the like. In some cases, data derivation calculator 143 may be configured to derive data computationally and/or predictively to add links among graph-based data nodes to enhance graph arrangement 160. In some examples, data derivation calculator 143 may be configured to enrich individual entity data by linking attributes imported from external feeds and calculating derived attributes algorithmically.

In one or more examples, one or more structural and/or functional elements described in FIG. 1, as well as below, may be implemented in hardware or software, or both, and optionally may implement any structure or functionality described in U.S. patent application Ser. No. 15/186,514, filed on Jun. 19, 2016, issued as U.S. Pat. No. 10,102,258 and titled "COLLABORATIVE DATASET CONSOLIDATION VIA DISTRIBUTED COMPUTER NETWORKS;" U.S. patent application Ser. No. 15/454,923, filed on Mar. 6, 2017, issued as U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,834, filed on Jul. 16, 2018, issued as U.S. Pat. No. 11,042,560 and titled "EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS;" U.S. patent application Ser. No. 15/926,999, filed on Mar. 20, 2018, issued as U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 15/927,004, filed on Mar. 20, 2018, issued as U.S. Pat. No. 11,036,716 and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser.

No. 15/985,702, filed on May 22, 2018, issued as U.S. Pat. No. 11,068,475 and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 15/985,705, filed on May 22, 2018, issued as U.S. Pat. No. 11,086,896 and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM;" U.S. patent application Ser. No. 16/137,292, filed on Sep. 20, 2018, issued as U.S. Pat. No. 10,824,637 and titled "MATCHING SUBSETS OF TABULAR DATA ARRANGEMENTS TO SUBSETS OF GRAPHICAL DATA ARRANGEMENTS AT INGESTION INTO DATA DRIVEN COLLABORATIVE DATASETS;" U.S. patent application Ser. No. 16/137,297, filed on Sep. 20, 2018, issued as U.S. Pat. No. 11,068,453 and titled "DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM;" and U.S. patent application Ser. No. 16/899,551, filed on Jun. 11, 2020 and titled "COMPUTERIZED TOOLS TO COLLABORATIVELY GENERATE QUERIES TO ACCESS IN-SITU PREDICTIVE DATA MODELS IN A NETWORKED COMPUTING PLATFORM," all of which are incorporated by reference.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof. In at least one example, enriched arrangement of graph data 160 may be implemented as a knowledge graph data arrangement (e.g., an enterprise knowledge graph).

Figure 2:
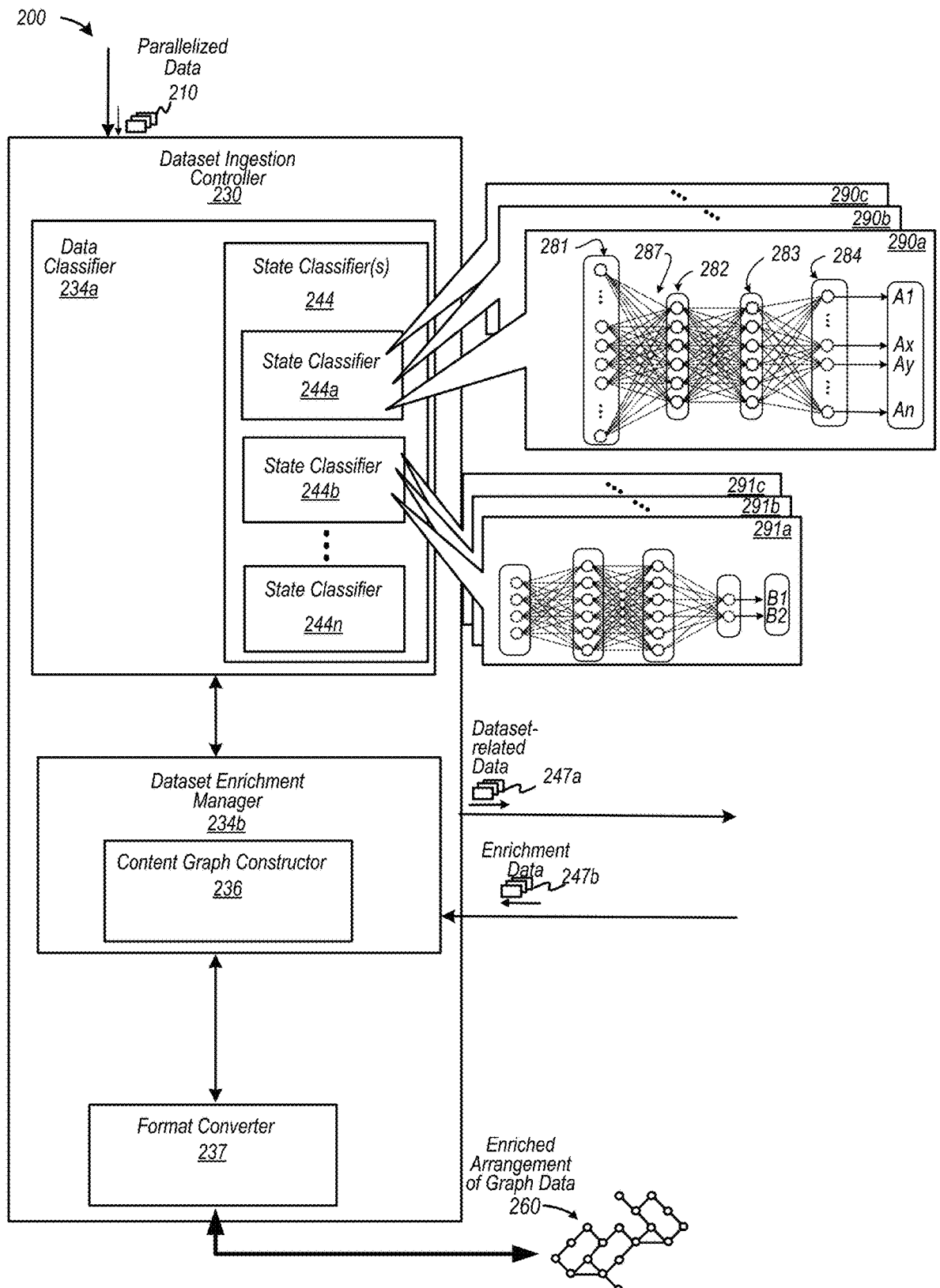
FIG. 2 depicts an example of a dataset ingestion controller, according to some examples.

FIG. 2 depicts an example of a dataset ingestion controller, according to some examples. Diagram 200 depicts a dataset ingestion controller 230 including a data classifier 234a, which is shown to include a one or more state classifiers 244, a dataset enrichment manager 234b, and a format converter 237. Dataset ingestion controller 230 may be configured to receive parallelized data 210 as well as enrichment data 247b from attribute correlator 342 of FIG. 3. Referring back to FIG. 2, elements depicted in diagram 200 may include structures and/or functions as similarly-named or similarly-numbered elements depicted in other drawings.

One or more state classifiers 244a to 244n may be configured to determine a "state" or "class" associated with portions of data received as parallelized data 210 to determine a state, type, or class of observation data. One or more state classifiers 244a to 244n may be configured to implement any number of statistical analytic programs, machine-learning applications, deep-learning applications, and the like. For example, state classifier 244a may include any number of predictive data modeling algorithms 290a to 290c that may be configured to perform pattern recognition and probabilistic data computations. For example, predictive data modeling algorithms 290a to 290c may apply "k-means clustering," or any other clustering data identification techniques to form clustered sets of data that may be analyzed to determine or learn optimal classifications of observation data and associated attributes and supplemental data (e.g., metadata) related thereto. In some examples, data classifier 234a and its components may be configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 290a to 290c may include any algorithm configured to extract features and/or attributes based on classifying data or identifying patterns of data, as well as any other process to characterize subsets of data As shown, predictive data model 290a may be configured to implement one of any type of neural networks (or any other predictive algorithm) as neural network model 290a, which may include a set of inputs 281 and any number of "hidden" or intermediate computational nodes 282 and 283, whereby one or more weights 287 may be implemented and adjusted (e.g., in response to training). Also shown, is a set of predicted outputs 284, such as terms defining a type of observation data. Predictive data model 290a may be configured to predict a class of "observation data," whereby one or more of any output A1, . . . , Ax, Ay, . . . An may represent a class of observation data, such as a "name" (e.g., a person's name), an "address," a "customer number," a "date of birth," an "email address," a "telephone number," or any other class of observation data that may be associated with attributes. In some examples, attributes may be input into inputs 281 to derive a class or type of observation data. As an example, data representing an address and a name may be applied to inputs 281 to identify an identity of an entity, such as a unique identity of a person.

As another example, inputs into state classifier 244b may determine affinity data that may indicate a degree of affiliation with another entity. For example, predictive data modeling algorithms 291a to 291c may be configured to predict whether an individual entity (e.g., a unique person, a unique product, etc.) is associated or affiliated with another entity. As such, inputs into predictive data modeling algorithms 291a to 291c may be configured to predict whether multiple entities, such as multiple people belong to the same household (or as a living unit) or multiple products originate from a common retailer or manufacturer. Output B1 may indicate a relatively high probability of association (e.g., a familial relationship exists) and output B2 may indicate a relatively low probability of association (e.g., a familial relationship does not exist). Other state classifiers, such as state classifier 244n, may generate data representing characterizations of parallelized data 210, including metadata, to determine a "context" in which observation data and associated attributes are modeled. A predicted context may facilitate enhanced accuracy in determining and resolving identities of entities.

Data outputs from state classifiers 244 and parallelized data 210 may be transmitted to dataset enrichment manager 234b, which may be configured to analyze ingested data relative to dataset-related data to determine correlations among dataset attributes of ingested data and other datasets 103b of FIG. 1 (and attributes, such as dataset metadata 103a), as well as schema data 103c, ontology data 103d, and other sources of data.

Referring back to FIG. 2, data enrichment manager 234b may be configured to identify correlated datasets based on correlated attributes as determined, for example, by an attribute correlator and received as enrichment data 247b, which, in at least some cases, may include probabilistic or predictive data specifying, for example, classification of a data attribute or a link to other datasets to enrich a dataset. The correlated attributes, as generated by an attribute correlator, may facilitate the use of derived data or link-related data, as attributes, to associate, combine, join, or merge datasets to form collaborative datasets, such as enriched arrangement of graph data 260. Enriched arrangement of graph data 260 may be implemented as a knowledge graph, at least in some examples.

Further to diagram 200, dataset enrichment manager 234b is shown to include a content graph constructor 236 that is configured to form a content graph (or a portion thereof) that builds upon similar or equivalent units of observation data and subsets of attributes that may be correlatable (e.g., correlatable or matched to a threshold degree). In some examples, content graph constructor 236 may be configured to form a portion of graph data 260 (e.g., a sub-graph) based on correlated and deduplicated subsets of observation fingerprint data. As an example, observation fingerprint data may include data representing one or more attributes such as a first name, a first initial, a last name, a residential address, an email address, a customer number, etc. Enrichment data 247b may include data specifying matched or correlated attribute data with which to merge or cluster content graphs to form a comprehensive graph that includes data regarding an entity (e.g., a person, a product, a service, etc.). According to some implementations, content graph constructor 236 may be configured to cluster various units of observation data to form a cluster of data representing an identifiable entity.

Format converter 237 may be configured to convert data generated by data classifier 234a and dataset enrichment manager 236b into a graph-based data format. Also, format converter 237 may be configured to convert one or more of parallelized data 210, dataset-related data 247a, and enrichment data 247b into a graph-based data format compatible with enriched arrangement of graph data 260. In view of the foregoing, structures and/or functionalities depicted in FIG. 2 as well as other figures herein, may be implemented as software, applications, executable code, application programming interfaces ("APIs"), processors, hardware, firmware, circuitry, or any combination thereof.

Figure 3:
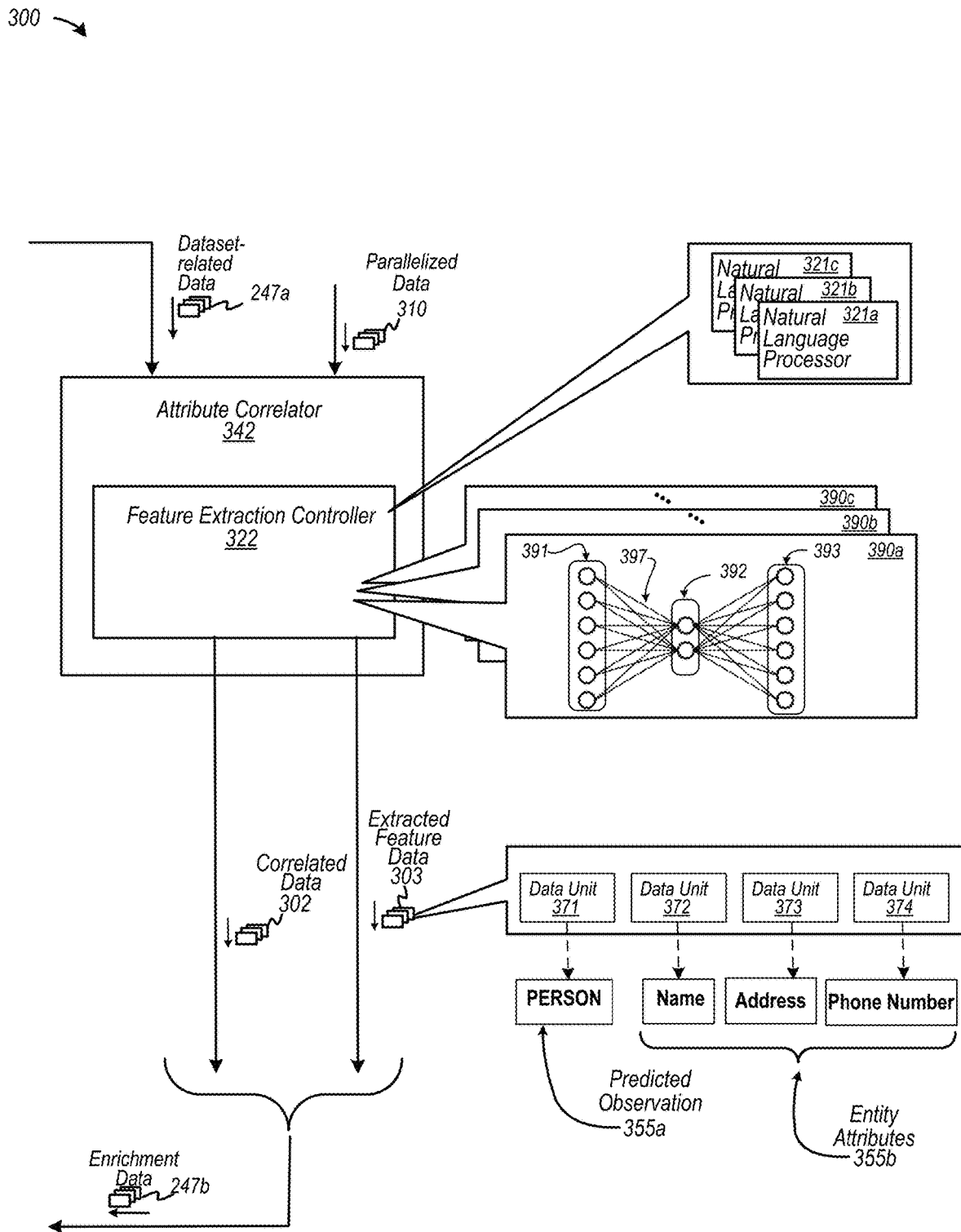
FIG. 3 depicts an example of an attribute correlator, according to some examples.

FIG. 3 depicts an example of an attribute correlator, according to some examples. Diagram 300 depicts an example of an attribute correlator 342 that may include a feature extraction controller 322, which may be configured to extract feature data to identify attributes. Attribute correlator 342 further may be configured to correlate attributes among any number of datasets, including attribute data associated with any number of units of observation data. As shown, attribute correlator 342 may receive dataset-related data 247a and parallelized data 310 to identify and correlate attributes, which, in turn, may be transmitted as enrichment data 247b to dataset enrichment manager 234b of FIG. 2 to construct one or more content graphs. Referring back to FIG. 3, elements depicted in diagram 300 may include structures and/or functions as similarly-named or similarly-numbered elements depicted in other drawings. Attribute correlator 342 may be configured to analyze data to detect patterns or data classifications that may resolve an issue, by "learning" or probabilistically predicting a dataset attribute through the use of Bayesian networks, clustering analysis, as well as other known machine learning techniques or deep-learning techniques, such as those described herein.

Feature extraction controller 322 may be configured to extract features as data representing correlated data 302 (e.g., as matched attribute data values). In at least one example, feature extraction controller 322 may include any number of natural language processing ("NLP") algorithms configured to correlate attribute data, such as matching or correlating names of entities (e.g., names of persons, products, services, etc.) to determine an identity of an entity. Natural language processor algorithms 321a to 321c may be configured, for example, to tokenize sentences and words, perform word stemming, filter out stop or irrelevant words, or implement any other natural language processing operation to determine text-related features to correlate attribute data, such as text data.

In some examples, feature extraction controller 322 may include any number of predictive data modeling algorithms 390a to 390c that may be configured to perform pattern recognition and probabilistic data computations. For example, predictive data modeling algorithms 390a to 390c may apply "k-means clustering," or any other clustering data identification techniques to form clustered sets of data that may be analyzed to determine or learn optimal correlation or matching of attribute data. In some examples, feature extraction controller 322 maybe configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 390a to 390c may include any algorithm configured to extract features and/or attributes based on identifying patterns of attribute data, as well as any other process to characterize subsets of data.

In the example shown, feature extraction controller 322 may be configured to implement any number of statistical analytic programs, machine-learning applications, deep-learning applications, and the like. Feature extraction controller 322 is shown to have access to any number of predictive models, such as predictive models 390a, 390b, and 390c, among others. As shown, predictive data model 390a may be configured to implement one of any type of neural networks to similar or equivalent data representations of attributes. For example, as predictive models 390a, 390b, and 390c may be configured to identity or match names associated with observation data, as well as matching addresses (or any other attribute) associated with a name to identify an individual entity. A neural network model 390a may include a set of inputs 391 and any number of "hidden" or intermediate computational nodes 392, whereby one or more weights 397 may be implemented and adjusted (e.g., in response to training). Also shown is a set of predicted outputs 393, such as text terms defining a match among attribute values (e.g., matched names, matched addressed, matched SKUs, etc.), among any other types of outputs.

Feature extraction controller 322 may include a neural network data model configured to predict (e.g., extract) contextual or related text terms based on generation of vectors (e.g., word vectors) with which to determine degrees of similarity (e.g., magnitudes of cosine similarity) to, for example, establish compatibility between attribute data (to indicate a degree of equivalency), at least in some examples. In at least one example, feature extraction controller 322 may be configured to implement a "word2vec" natural language processing algorithm or any other natural language process that may or may not transform, for example, text data into numerical data (e.g., data representing a vector space).

According to some examples, feature extraction controller 322 may include algorithms configured to detect a degree of similarity between, for example, strings of texts to match names, addresses, etc. In some implementations, feature extraction controller 322 may be configured to implement edit distance algorithms and/or phonetic encoding algorithms, among others, to identify matched attribute values. For example, feature extraction controller 322 may implement an algorithm configured to determine the Levenshtein Distance to calculate a difference between data representing strings of alphanumeric text (e.g., to determine similarity or equivalency). In another example, a phonetic algorithm, such as a Soundex algorithm, may be implemented to detect a degree to which text strings or alphanumeric text strings may be similar or equivalent. In yet other examples, a Jaro-Winkler distance algorithm may be implemented to detect a degree of equivalency between or among text strings.

Thus, feature extraction controller 322 may be configured to identify correlated data 302 and generate extracted feature data 303, which may include one or more groups of data units 371 to 374, whereby each group of data units 371 to 374 may be associated with a unit of observations data or a unit of attribute data, or both. As example, consider that feature extraction controller 322 may be configured to identity correlatable data units 371 to 374 as attribute data that may match with other attribute data values. Here, data unit 371 may specify a "person" as a class of data indicative of a unit of predicted observation data 355a. Also, data units 372 to 374 may describe attribute values "name," "address," and "phone number" as entity attributes 355b.

In view of the foregoing, attribute correlator 342 may be configured to generate electronic messages including correlated data 302 and extracted feature data 303 that may be transmitted as enrichment data 247b to a content graph constructor, such as depicted in FIG. 2. A content graph constructor may be configured to aggregate or cluster observation data 355a with other instances of matched or correlatable units of observation data. Further, structures and/or functionalities depicted in FIG. 3 as well as other figures herein, may be implemented as software, applications, executable code, application programming interfaces ("APIs"), processors, hardware, firmware, circuitry, or any combination thereof.

Figure 4:
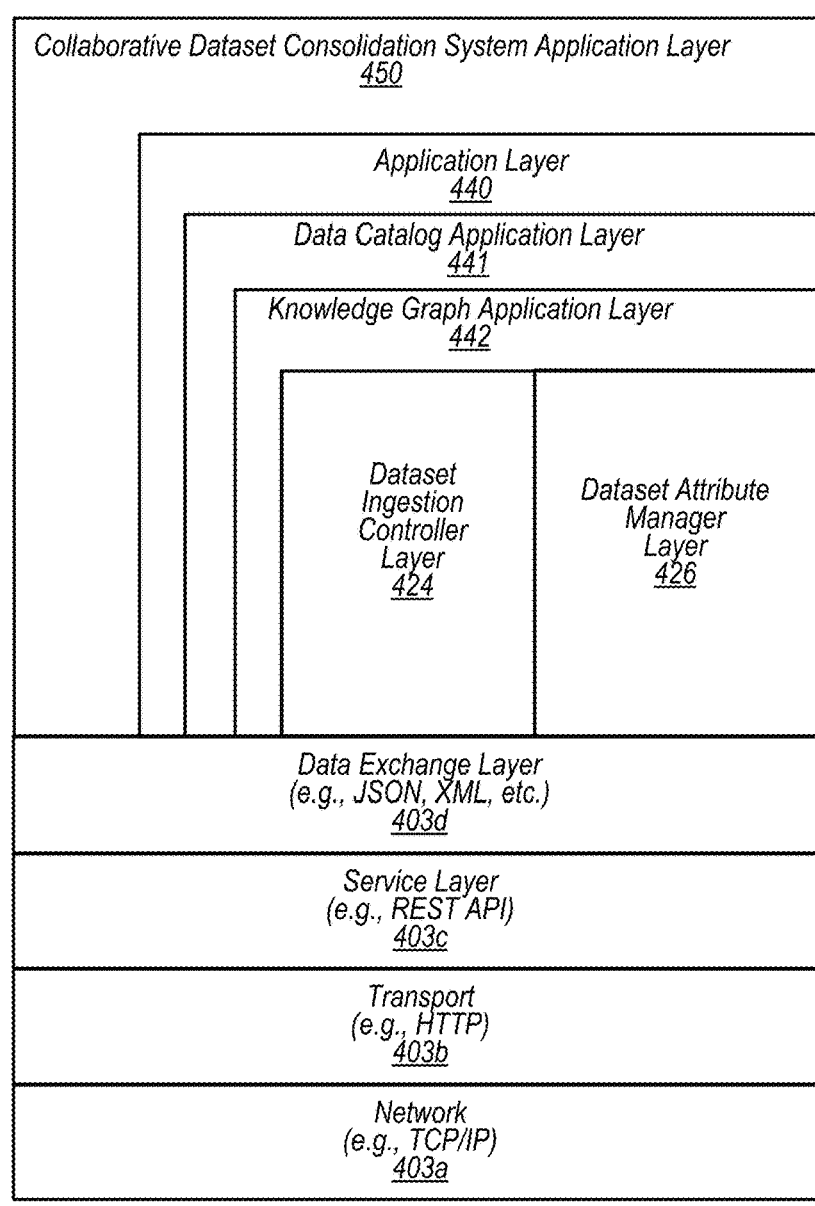
FIG. 4 illustrates an exemplary layered architecture for implementing an collaborative dataset consolidation system application, according to some examples.

FIG. 4 illustrates an exemplary layered architecture for implementing a collaborative dataset consolidation system application, according to some examples. Diagram 400 depicts application stack ("stack") 401, which is neither a comprehensive nor a fully inclusive layered architecture to correlate subsets of parallelized data from disparately-formatted data sources to identify entity data and to aggregate graph data portions, among other things. One or more elements depicted in diagram 400 of FIG. 4 may include structures and/or functions as similarly-named or similarly-numbered elements depicted in other drawings, or as otherwise described herein, in accordance with one or more examples, such as described relative to any figure or description herein.

Application stack 401 may include a collaborative dataset consolidation system application layer 450 upon application layer 440, which, in turn, may be disposed upon any number of lower layers (e.g., layers 403a to 403d). Collaborative dataset consolidation system application layer 450 may be configured to correlate subsets of parallelized data from disparately-formatted data sources to identify entity data and to aggregate graph data portions, as described herein. Further, collaborative dataset consolidation system application layer 450 and application layer 440 may be disposed on data exchange layer 403d, which may implemented using any programming language, such as HTML, JSON, XML, etc., or any other format to effect generation and communication of requests and responses among computing devices and computational resources constituting an enterprise, an entity, and/or a platform configured to correlate data and information expeditiously, such as information regarding products or services aligned with data in targeted data sources compatible with data integration. Data exchange layer 403d may be disposed on a service layer 403c, which may provide a transfer protocol or architecture for exchanging data among networked applications. For example, service layer 403c may provide for a RESTful-compliant architecture and attendant web services to facilitate GET, PUT, POST, DELETE, and other methods or operations. In other examples, service layer 403c may provide, as an example, SOAP web services based on remote procedure calls ("RPCs"), or any other like services or protocols (e.g., APIs, such as REST APIs, etc.). Service layer 403c may be disposed on a transport layer 403b, which may include protocols to provide host-to-host communications for applications via an HTTP or HTTPS protocol, in at least this example. Transport layer 403b may be disposed on a network layer 403a, which, in at least this example, may include TCP/IP protocols and the like.

Figure 13:
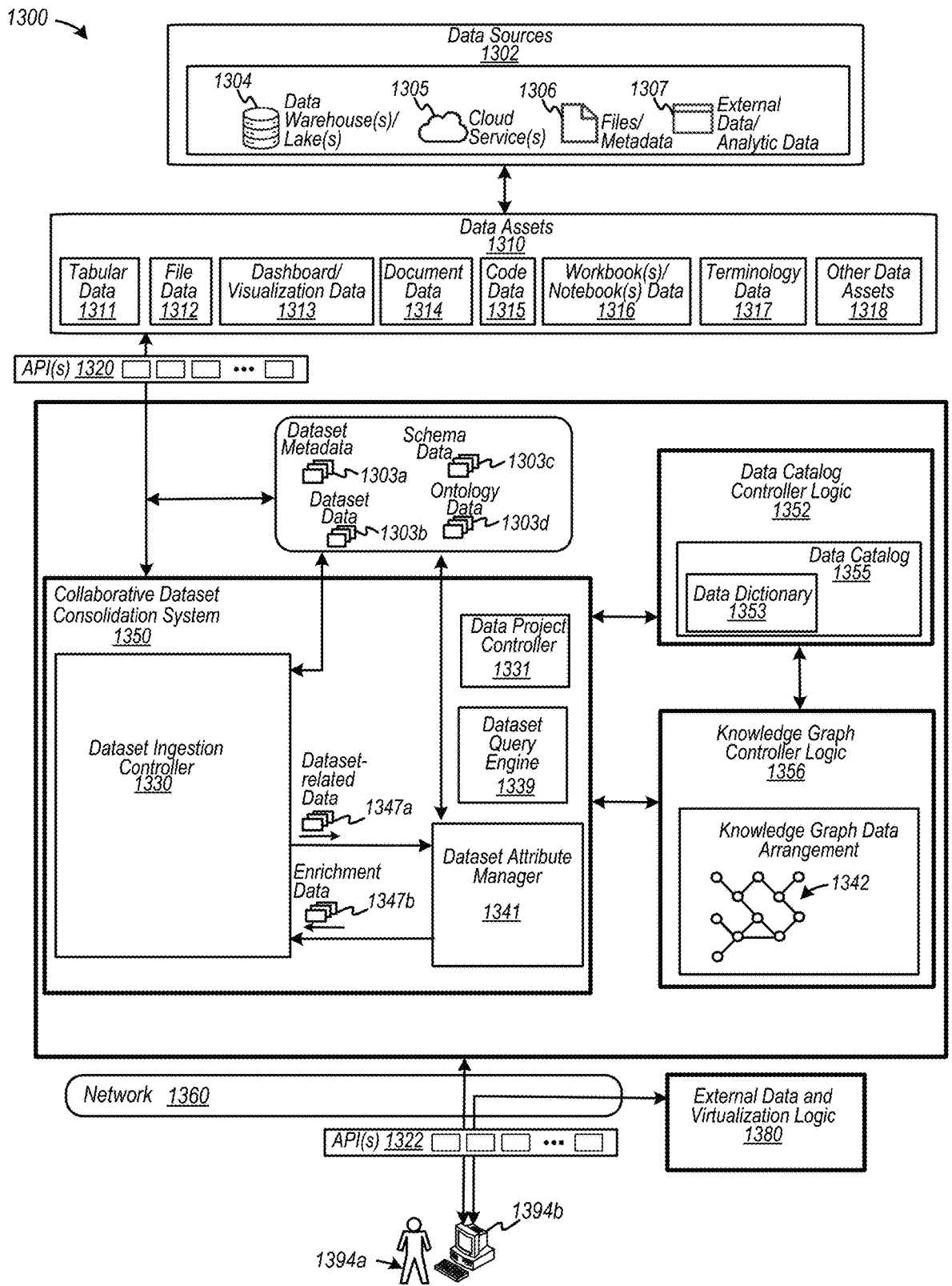
FIG. 13 depicts an example of a data catalog and a knowledge graph implement as a cloud-based service, according to some examples.

As shown, collaborative dataset consolidation system application layer 450 may include (or may be layered upon) an application layer 440 that includes logic constituting a data catalog application layer 441, which is optional and referenced in FIG. 13, a knowledge graph application layer 442, a dataset ingestion controller layer 424, and a dataset attribute manager layer 426. In various examples, layers 424, 426, 441, 442, and 450 may include logic to implement the various functionalities described herein.

Any of the described layers of FIG. 4 or any other processes described herein in relation to other figures may be implemented as software, hardware, firmware, circuitry, or a combination thereof If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by data.world, Inc., of Austin Tex., U.S.A., or the like. The above-described techniques may be varied and are not limited to the embodiments, examples or descriptions provided.

Figure 5:
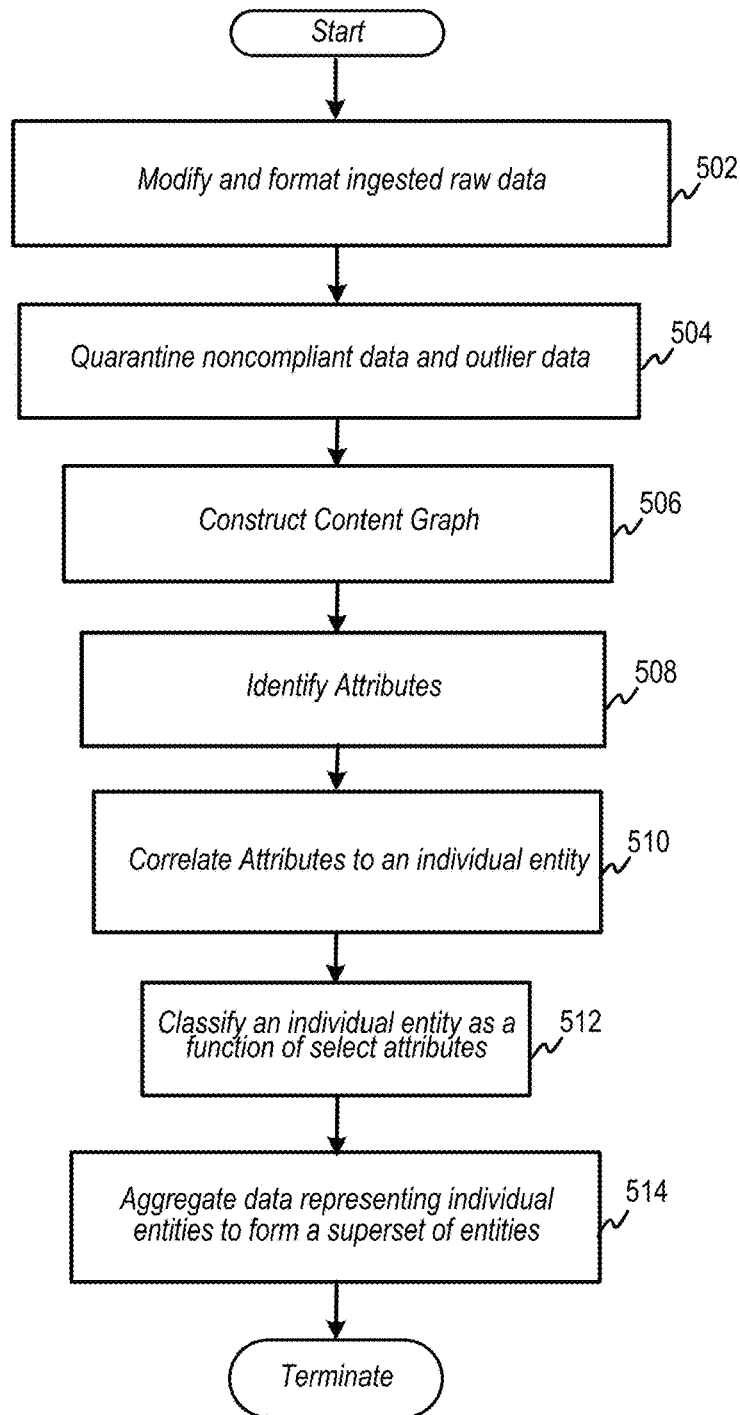
FIG. 5 is a flow diagram as an example of analyzing parallelized data formatted as graph-based data with correlated data attributes to consolidate observation data to form content graph portions, according to some embodiments.

FIG. 5 is a flow diagram as an example of analyzing parallelized data formatted as graph-based data with correlated data attributes to consolidate observation data to form content graph portions, according to some embodiments. Flow 500 is an example of aggregating or consolidating observation data to identify individual entities and supersets of individual entities in accordance with various examples described herein.

At 502, parallelized data may be received from multiple disparate data sources in a computing system that includes multiple processors configured to facilitate massively parallel processing to extract attribute data to analyze and correlate data values associated with various units of attribute data in parallel. Further, raw data that may be ingested as parallelized data may be modified to remediate (e.g., "clean" and "prepare") ingested data to be formatted or referenced as graph-based data in an arrangement of graph data, such as a knowledge graph. Remediation of data may be performed in accordance with rules or a set of predictively compliant data thresholds to identify valid data. As an example, data representing a state of Texas may be modified or normalized to reflect an alternative representation of TX. Further, data issues can be detected and corrected based on a lexical structure. Examples may include trimming quotes and leading/trailing whitespace(s), and correcting field misuse errors, such as modifying data fields first name and last name to correct for an invalid last name. For example, data fields {firstName: "John Smith" and lastName: "'OCCUPANT"} may be modified to reflect data fields {firstName: "'John" and lastName: "Smith"}, thereby removing "occupant" as an erroneous last name of an entity.

At 504, data representing a subset of parallelized data may be classified to identify observation data, such as a class or type of observation data. In some examples, data that may not comply with rules (e.g., based on conformance to an ontology, semantic-defined data, a data dictionary, a glossary, etc.) to determine noncompliant data or outlier data, which may be quarantined for further processing to, for example, generate a repair graph with which to integrate subsequently with a data arrangement on an enriched graph. In some examples, data records of individual entities may be quarantined if data includes (1) an absence of a first name and a last name, (2) addresses that do not conform postal standards (e.g., invalid zip codes and state identifiers), (3) email addresses that do not conform to an "id@domain.tld" format, (4) telephone numbers that do not conform with a country's standards (e.g., a U.S. phone number that does not include 10 digits), (5) blacklisted data references, and (6) other non-compliant data. Further at 504, overly-matched or overly-correlated data may be deemed as outliers that may complicate resolution of an identity of an entity, and thus may be quarantined or discarded. For example, residential addresses, email addresses, phone number and customer numbers that are linked to a large number of observation fingerprints, such as 1,000 instances, may be refer to an organization or a group of individual entities. Hence, such data may be of little or negligible value to determine an identity of a specific entity, such as an individual person, and may be quarantined or discarded (e.g., into a repair graph to receive subsequent processing to determine whether the associated data may be included to enrich an arrangement of graph data).

At 506, one or more content graphs in a graph data format may be constructed based on, for example, a class of observation data and one or more entity attributes, such as a name, an address, and other attribute data. A unit of observation data may be referred to as "observation fingerprint," which may be an electronically digital fingerprint, or a portion thereof, associated with an entity.

At 508, data representing one or more entity attributes associated with observation data may be identified based on any number of sources. For example, a predictive data classifier or an attribute correlator may be configured to identify a set of terms (e.g., in a data dictionary) with which to search parallelized data or converted graph-based data. Identified attribute data may be linked or otherwise associated with a unit of observation data.

At 510, a subset of parallelized data may be correlated to other subsets of the parallelized data associated with a class or unit of observation data to form correlated subsets of parallelized data. For example, each data value associated with a corresponding attribute may be used to correlate, match, or otherwise detect equivalent units of attribute data associated with other units of observation data (e.g., other digital observation fingerprints). Data values of attribute data may be matched against other data values of other attribute data by an attribute correlator configured to identify and correlate patterns of data. According to some examples, correlation of subsets of parallelized data or associated attribute data values may include forming adjacency nodes linked to units of attributes in a content graph (e.g., a sub-graph). Multiple adjacency nodes may be linked together to cluster or aggregate similar or equivalent attribute data values that may constitute or relate to an individual entity. An adjacency node may be a portion of constructed content graph that connects or links an attribute (e.g., a name) and other indicator values (e.g., other attribute values) to capture data relationships comprehensively.

At 512, one or more units of observation data (and correlated attribute data) may be classified as an individual entity. For example, multiple units of observation data may be clustered together to form an enriched content graph that describes an individual entity, such as a person, a product, a service, or any other entity. In some implementations, correlated subsets of parallelized data may be clustered to identify an individual entity using data representing multiple adjacency node data linked together.

At 514, data representing multiple individual entities may be aggregated or clustered to form a set of entities based on correlated subsets of parallelized data. An individual entity may be aggregated or clustered with data representing other individual entities to form a group of clustered individual entities. For example, multiple individual entities may represent multiple persons having a familial relationship or a common geographic location (e.g., a household, a living unit, or a common residential address at which the entities reside).

In view of the foregoing, flow 500 may be configured to modify a graph data arrangement to enrich data stored in association with, for example, a knowledge graph.

Figure 6:
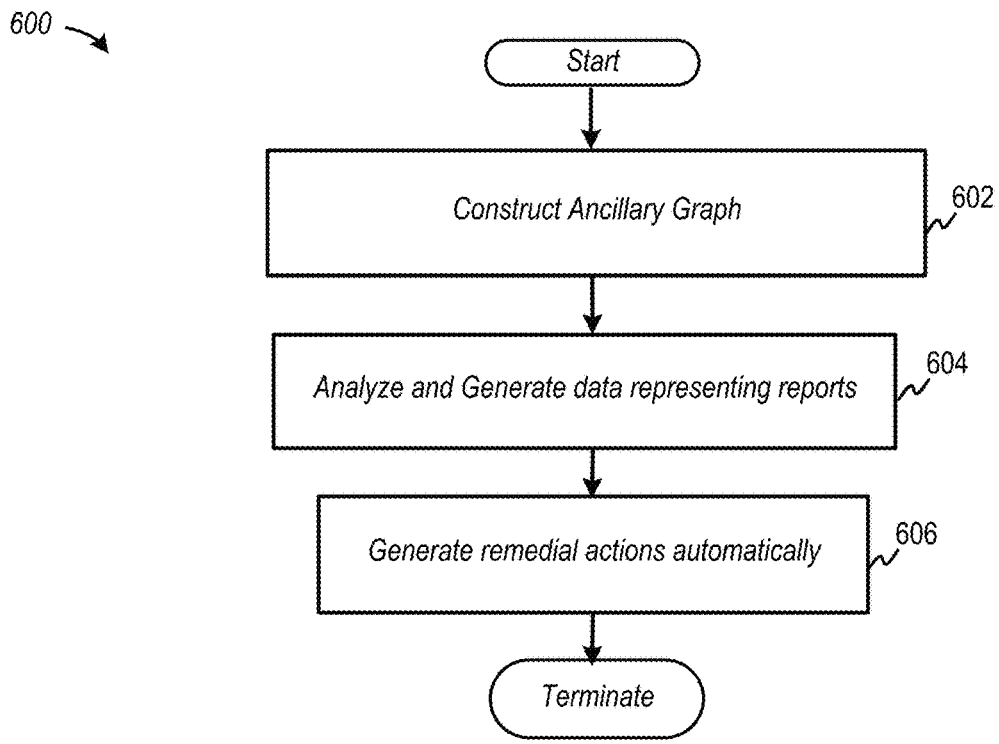
FIG. 6 is a flow diagram as an example of forming an ancillary graph to remediate data for integration into an enriched arrangement of graph data, according to some embodiments.

FIG. 6 is a flow diagram as an example of forming an ancillary graph to remediate data for integration into an enriched arrangement of graph data, according to some embodiments. Flow 600 may be initiated at 602, at which an ancillary graph may be constructed, whereby the ancillary graph may be referred to as a repair graph. In some examples, noncompliant data or outlier data, as described herein, may be quarantined in a repair graph for subsequent analysis to determine whether such data may be validated for inclusion into an enriched arrangement of graph data (e.g., a knowledge graph). At 604, data representing an ancillary graph or repair graph may be analyzed automatically to generate data representing an electronic report describing and characterizing noncompliant and outlier data with suggestions to resolve and validate such data. At 606, remedial actions may be generated automatically (e.g., at a collaborative dataset consolidation system) to transmute noncompliant and outlier data into valid data, which may be included in a knowledge graph.

Figure 7:
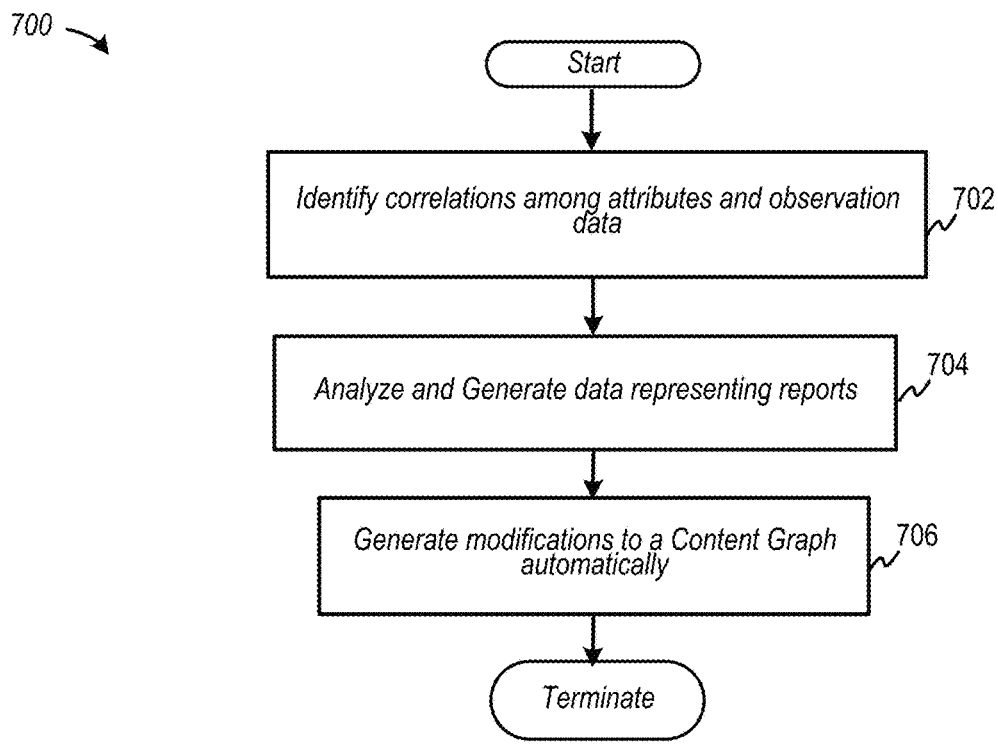
FIG. 7 is a flow diagram as an example of modifying the content graph for integration into an enriched arrangement of graph data, according to some embodiments.

FIG. 7 is a flow diagram as an example of modifying the content graph for integration into an enriched arrangement of graph data, according to some embodiments. Flow 700 may be initiated at 702, at which correlation among attribute data and observation data may be identified, as well as adjacency node data. At 704, data representing a content graph may be analyzed automatically to generate data representing an electronic report describing and characterizing data constituting a content graph. At 706, remedial actions may be generated automatically (e.g., at a collaborative dataset consolidation system) to modify a content graph, which may be integrated into a knowledge graph.

Figure 8:
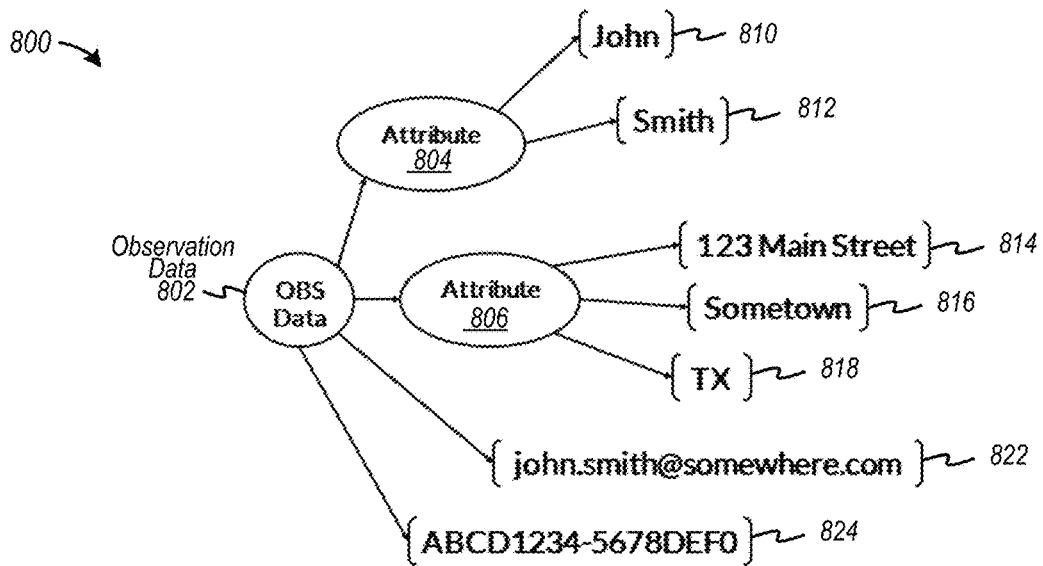
FIG. 8 depicts an example of a portion of a content graph, according to some examples.

FIG. 8 depicts an example of a portion of a content graph, according to some examples. Diagram 800 depicts attribute data 804 and 806 being associated with a unit of observation data 802. Attribute data 804 may represent name data, and may have attribute data values of 810 ("John") and 812 ("Smith"). Attribute data 806 may represent address data, and may include attribute values of 814 ("123 Main Street"), 816 (city of "Sometown"), and 818 (state of Texas, or "TX"). A unit of observation data 802 may also be linked to other attribute data, such as attribute data value 822 (e.g., an email address of "john.smith@somewhere.com") and attribute data value 824 (e.g., a customer number or identifier "ABCD1234-5678DEF0"). A dataset analyzer and/or an attribute correlator may be configured to correlate or match address nodes that may be used to resolve an identity of an entity, whereby some node data may be used to infer whether a subset of addresses may be semantically equivalent or similar. Further, attribute data values 804, 806, 822, and 824 may be used to match or correlate with other equivalent attribute data values to determine whether unit of observation data 802 may represent an identity of an entity as does other units of observation data. Such units of observation data may be aggregated to form a content graph.

Figure 9A:
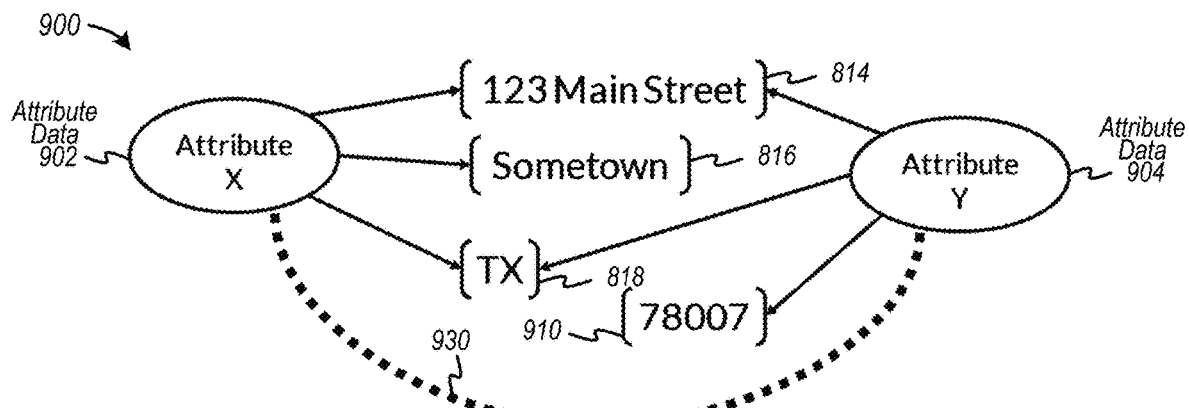
FIGS. 9A and 9B depict examples of correlating attribute data values to construct a content graph portion, at least in some examples.
Figure 9B:
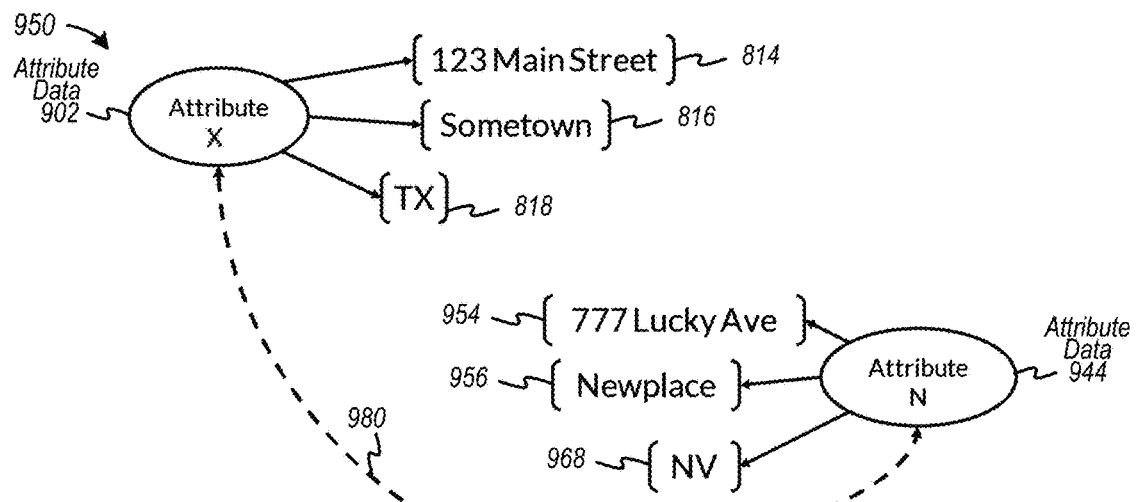

FIGS. 9A and 9B depict examples of correlating attribute data values to construct a content graph portion, at least in some examples. Diagram 900 of FIG. 9A depicts a first unit of attribute data 902 ("attribute X") as being linked to attribute data values 814, 816, and 818, whereas a second unit of attribute data 904 ("attribute Y") may include attribute data values 814, 818, and 910 (zip code of "78007"). A dataset analyzer and/or an attribute correlator (or any other component of a collaborative dataset consolidation system) may be configured to correlate attribute data 902 and 904 to form a data relationship or link 930 indicating attribute data 902 and 904 refer to an equivalent geographic location. Diagram 950 of FIG. 9B depicts a first unit of attribute data 902 associated with attribute data values 814, 816, and 818. Also, diagram 950 depicts a second unit of attribute data 944 ("attribute N") that may include attribute data values 954, 956, and 968. In some examples, a dataset analyzer and/or an attribute correlator (or any other component of a collaborative dataset consolidation system) may be configured to determine that an individual entity (e.g., a person) or a group of individual entities (e.g., a family) have been associated with attribute data 902 during a first period of time, but may be associated with attribute data 944 during a second period of time after moving from one geographic location to another geographic location.

Figure 10A:
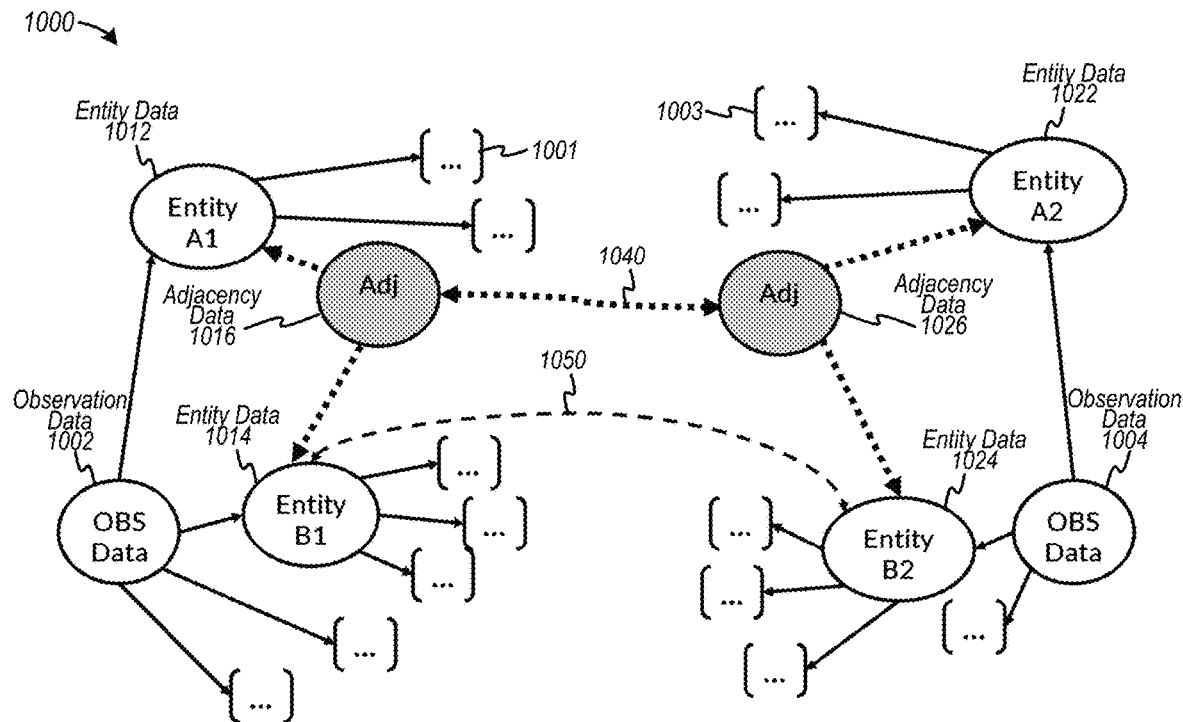
FIGS. 10A and 10B depict other examples of correlating attribute data values to construct a content graph portion, at least in some examples.
Figure 10B:
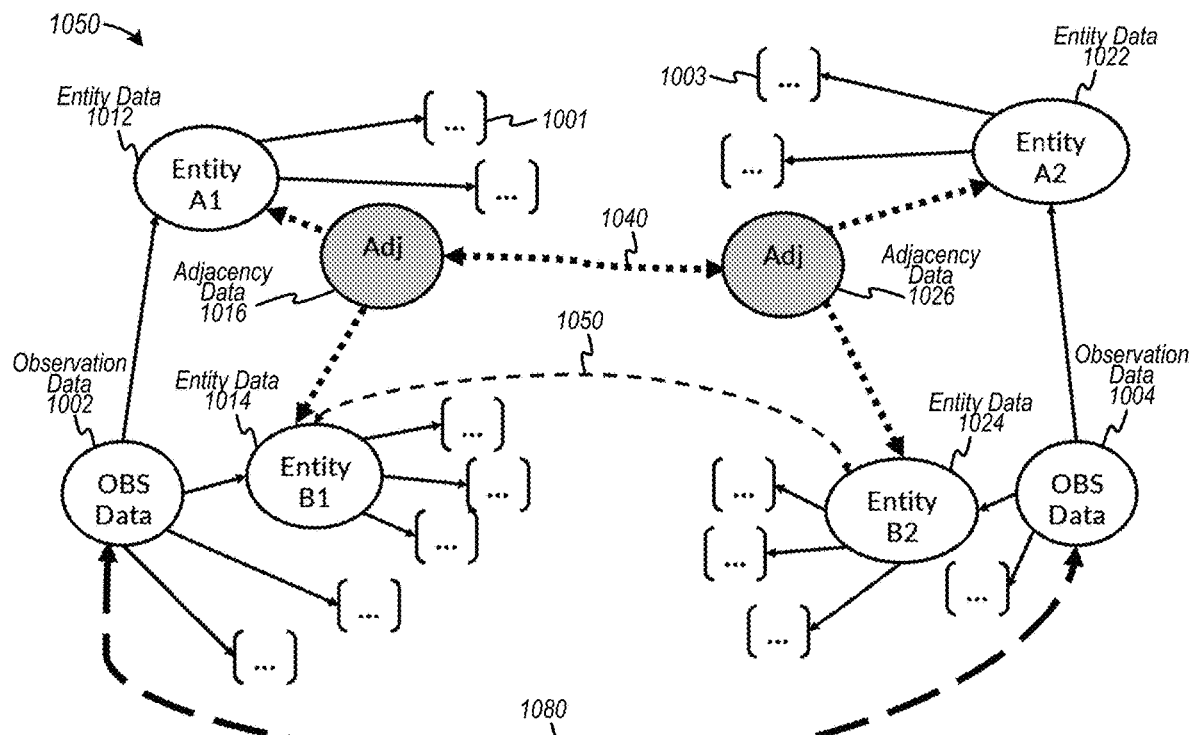

FIGS. 10A and 10B depict other examples of correlating attribute data values to construct a content graph portion, at least in some examples. Diagram 1000 depicts a first unit of observation data 1002, as an observation digital fingerprint, that may include entity attribute data 1012 (e.g., entity A1 may be data representing a name) having attribute data values 1001. The first unit of observation data 1002 may also include entity attribute data 1014 (e.g., entity B1 may be data representing an address), which associated attribute data values (shown as bracketed ellipses). Diagram 1000 also depicts a second unit of observation data 1004, as another observation digital fingerprint, that may include entity attribute data 1022 (e.g., entity A2 may be data representing a name) having attribute data values 1003. The second unit of observation data 1022 may also include entity attribute data 1024 (e.g., entity B2 may be data representing an address), which associated attribute data values (shown as bracketed ellipses). A dataset analyzer and/or an attribute correlator (or any other component of a collaborative dataset consolidation system) may be configured to correlate or match entity attribute data 1014 and 1024 via link 1050, and may be further configured to establish data representing adjacency nodes 1016 and 1026 that may be associated together via link 1040. As shown, adjacency node 1016 may be linked to entity data 1012 and 1014, and adjacency node 1026 may be linked to entity data 1022 and 1024.

Diagram 1050 depicts aggregation or clustering of observation data 1002 and 1004. For example, a dataset analyzer and/or an attribute correlator (or any other component of a collaborative dataset consolidation system) may be configured to form an association 1080 to specify that digital fingerprints of units of observation data 1002 and 1004 may resolve to represent an individual entity, such as a uniquely-identifiable person.

Figure 11A:
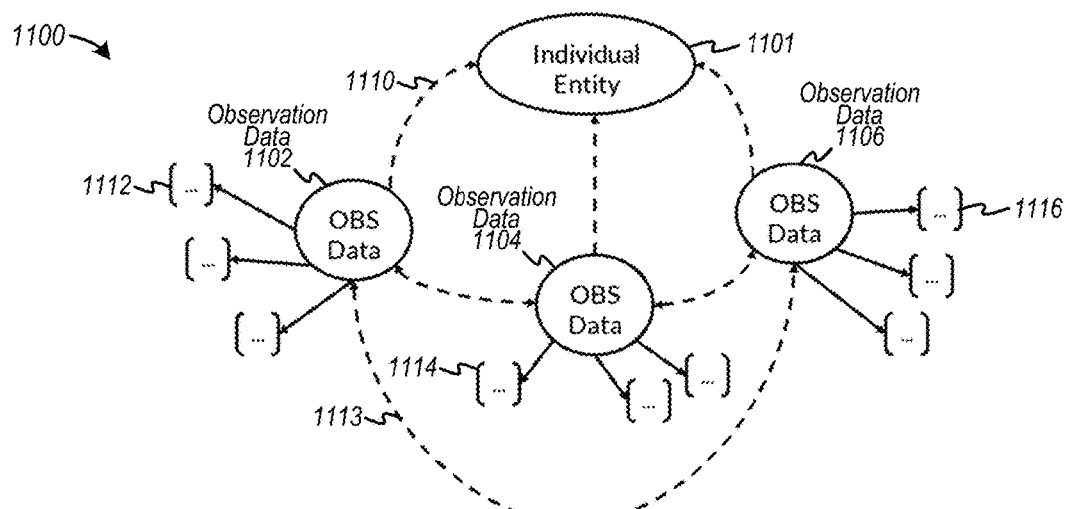
FIGS. 11A and 11B depict examples of clustering units of observation data of content graph portions to identify an individual entity, at least in some examples.
Figure 11B:
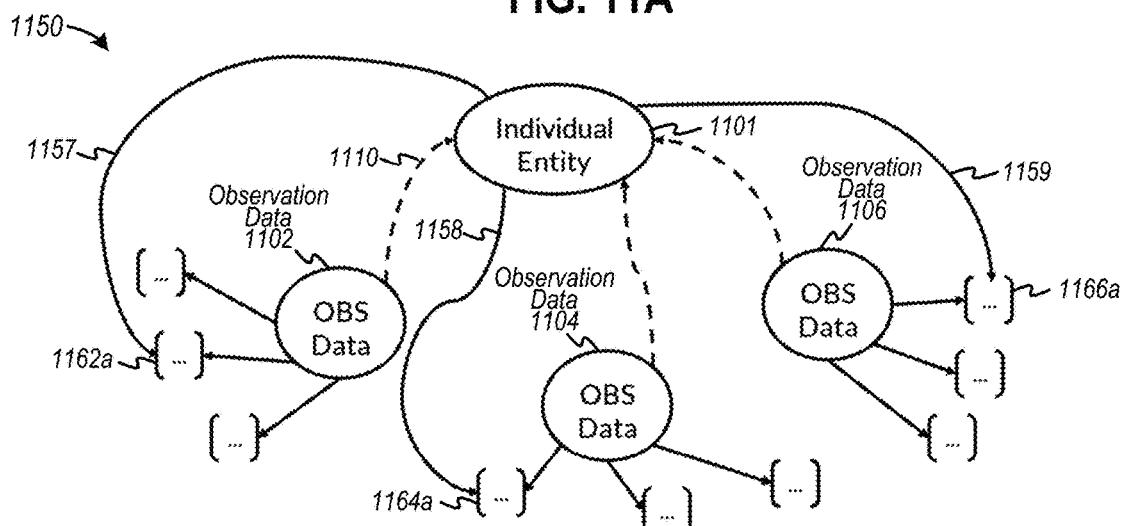

FIGS. 11A and 11B depict examples of clustering units of observation data of content graph portions to identify an individual entity, at least in some examples. Diagram 1100 of FIG. 11A depicts several units of observation data 1102, 1104, and 1106 associated with entity attribute data values 1112, 1114, and 1116, respectively. As shown in this example, a dataset analyzer and/or an attribute correlator (or any other component of a collaborative dataset consolidation system) may be configured to form associations among digital fingerprints representing observation data 1102, 1104, and 1106 to aggregate or clustering the associated data together to form links 1110 to establish data representing an individual entity 1101. As such, observation data 1102, 1104, and 1106 may be clustered to resolve an identity of an individual, such as a specific person, specific product, specific service, and the like. Diagram 1150 of FIG. 11B depicts identification of attribute data values via links 1157, 1158, and 1159 associated with individual entity 1101 that may more comprehensively describe individual entity 1101 than a single unit of observation data. As shown, individual entity 1101 may include attribute data values 1162, 1164a, and 1166a based on aggregation or clustering of units of observation data 1102, 1104, and 1106.

Figure 12:
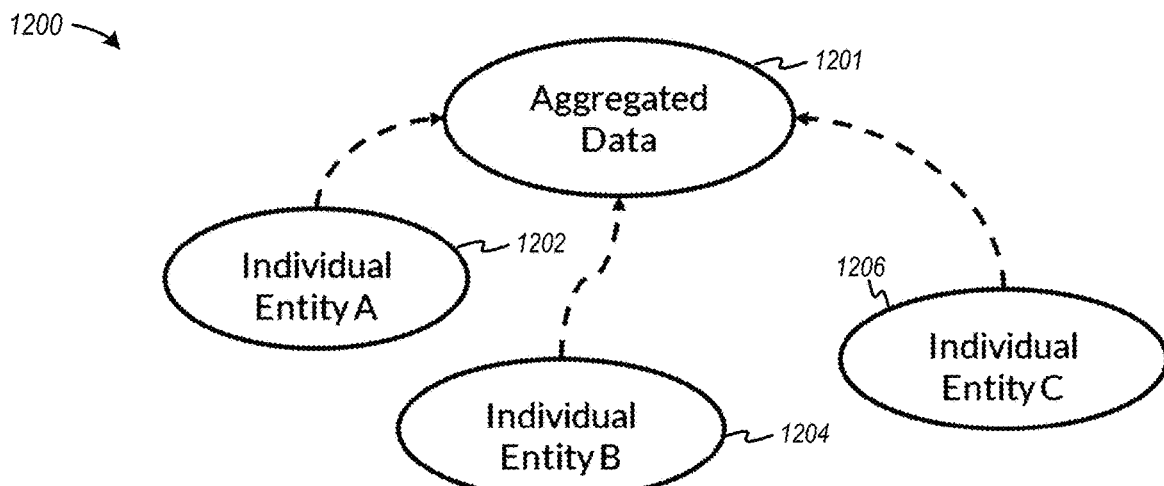
FIG. 12 depicts an example of data representing aggregating individual entities to form aggregated data, according to some examples.

FIG. 12 depicts an example of data representing aggregating individual entities to form aggregated data, according to some examples. Diagram 1200 illustrates clustering or aggregation of individual entities 1202, 1204, and 1206 to represent a hierarchical data relationship as aggregated data 1201. For example, individual entities 1202, 1204, and 1206 may represent three unique individuals who live together (e.g., as a family). Thus, aggregated data 1201 may represent the group of individual entities as, for example, a family.

FIG. 13 depicts an example of a data catalog and a knowledge graph implement as a cloud-based service, according to some examples. Diagram 1300 depicts a computing system accessible via a network 1360 (e.g., the Internet) and application programming interfaces ("APIs") 1322 (or other data connectors). In this example, a computing system may include hardware (e.g., processors) and software to implement a collaborative dataset consolidation system 1350. In some cases, a user 1394 at a remote computing device 1394b may access a collaborative dataset consolidation system 1350 as a cloud-based service. Collaborative dataset consolidation system 1350 of FIG. 13 may include a dataset ingestion controller 1330 and a dataset attribute manager 1341 to exchange dataset-related data 1347*a* and enrichment data 1347*b*.

Diagram 1300 also depicts collaborative dataset consolidation system 1350 including or being configured to access data associated with data catalog controller logic 1352 to access, manage, and use a data catalog (e.g., an enterprise data catalog). Collaborative dataset consolation system 1350 may include or may be configured to access data associated with knowledge graph controller logic 1356 to access, manage, and use a knowledge graph data arrangement 1342. Thus, knowledge graph data arrangement 1342 may be implemented as a knowledge graph-as-a-service (e.g., "KGaas"). In some non-limiting examples, knowledge graph data arrangement 1342 may interact electronically with data catalog controller logic 1352 to form a network of concepts and semantic relationships describing data and metadata associated with the knowledge graph. Further, knowledge graph data arrangement 1342 may be configured to integrate knowledge, information, and data at a relatively large scale as a graph data mode, whereby knowledge graph data arrangement 1342 may include nodes representing tables, columns, dashboards, reports, business terms, users, etc.

Collaborative dataset consolation system 1350 may access data locally or remotely at any data source, such as data sources 1302 that may be accessible via APIs 1320. Examples of such data may include dataset metadata 1303*a* (e.g., descriptor data or information specifying dataset attributes), dataset data 1303*b* (e.g., reference data stored locally or remotely to access data in any local or remote data storage, such as data in data sources 1302), schema data 1303*c* (e.g., sources, such as schema.org, that may provide various types and vocabularies, glossaries, data dictionaries, and the like), and ontology data 1303*d* from any suitable ontology and any other suitable types of data source. Elements depicted in diagram 1300 may include structures and/or functions as similarly-named or similarly-numbered elements depicted in other drawings.

Data sources 1302 may be configured to provide (e.g., external data) as data assets 1310. Data sources 1302 may include any data storage or data arrangement, such as a data warehouse or a data lake 1304, one or more cloud services 1305, one or more data files and metadata files 1306, and any other external data or analytic data 1307. Data assets 1310 may include tabular data 1311, any type of file data 1312, dashboard and/or visualization data 1313, document data 1314 (e.g., a PDF document), code data 1315 (e.g., a portion of Python code or code-generated data, or JSON code), workbooks and/or notebook data 1316 (e.g., a Jupyter notebook, etc.), terminology data 1317, and any other data assets 1318.

Collaborative dataset consolation system 1350 may include a data project controller 1331 may be configured to provision and control a data project interface (not shown) as a computerized tools, or as controls for implementing computerized tools to procure, generate, manipulate, and share datasets, as well as to share query results and insights (e.g., conclusions or subsidiary conclusions) among any number of collaborative computing systems (and collaborative users of system 1350). In some examples, data project controller 1331 may be configured to provide computerized tools (or access thereto) to establish a data project, as well as invite collaboration and provide real-time (or near real-time) information as to insights to data analysis (e.g., conclusions) relating to a dataset or data project, as well as a data dictionary or glossary that may constitute at least a portion of data catalog 1355. Data project controller 1331 may be configured to identify a potential resolution, aim, goal, or hypothesis through, for example, application one or more queries against a dataset (e.g., canonical dataset). Data project controller 1331 may be configured to provide computerized tools (or access thereto) to provide an electronic "workspace" in which multiple datasets may be aggregated, analyzed (e.g., queried), and summarized through generation and publication of insights that may be integrated into knowledge graph data arrangement 1342. In view of the above, data project controller 1331 may be configured to control components of collaborative dataset consolidation system 1350 to provision computerized tools to facilitate interoperability of datasets (e.g., canonical datasets) with other datasets in different formats or with various external computerized analysis tools (e.g., via APIs 1322 and 1320), whereby external computerized analysis tools may be disposed external to collaborative dataset consolidation system 1350.

Examples of external computerized analysis tools include external statistical and visualization applications, such as Tableau®, that may be accessible as external data and visualization logic 1380. Further, data project controller 1331 may be configured to access, manage, build, and use data representing a data dictionary 1353 (e.g., a composite data dictionary), which may be managed electronically by data catalog controller logic 1352. In some examples, data representing data dictionary 1353 may be a subset of data representing a data catalog 1355. As data catalog 1355 may be disposed in a cloud-based computing system, data catalog may be referred to as a "data catalog-as-a-service," at least in some examples. In some non-limiting examples, a data catalog 1355 and/or a data dictionary 1353 may include data or code, or both, that may be configured to create (e.g., automatically), manage, modify, use descriptor data that may identify metadata associated with datasets that can be implemented to enrich a graph-based data arrangement (e.g., knowledge graph data arrangement 1342). An example of a data dictionary may be implemented as described in U.S. patent application Ser. No. 15/985,702, filed on May 22, 2018, now U.S. Pat. No. 11,068,475 and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," which is hereby incorporated by reference.

Dataset query engine 1339 may be configured to receive a query (e.g., from computing device 1394*b*) to apply against a combined dataset, which may include at least a portion of knowledge graph data arrangement 1342. In some examples, a query may be implemented as either a relational-based query (e.g., in an SQL-equivalent query language) or a graph-based query (e.g., in a SPARQL-equivalent query language). Further, a query may be implemented as either an implicit federated query or an explicit federated query.

According to some examples, dataset query engine 1339 may be configured to access data associated with knowledge graph data arrangement 1342 as atomized datasets that may be formed as triples compliant with an RDF specification. Further, knowledge graph data arrangement 1342 may be stored in one or more repositories, at least one of which may be a database storage device formed as a "triplestore." Note that in some cases, data referenced to knowledge graph data arrangement 1342 may also be of any data format, such as CSV, JSON, XML, XLS, MySQL, binary, RDF, or other similar or suitable data formats.

Figure 14:
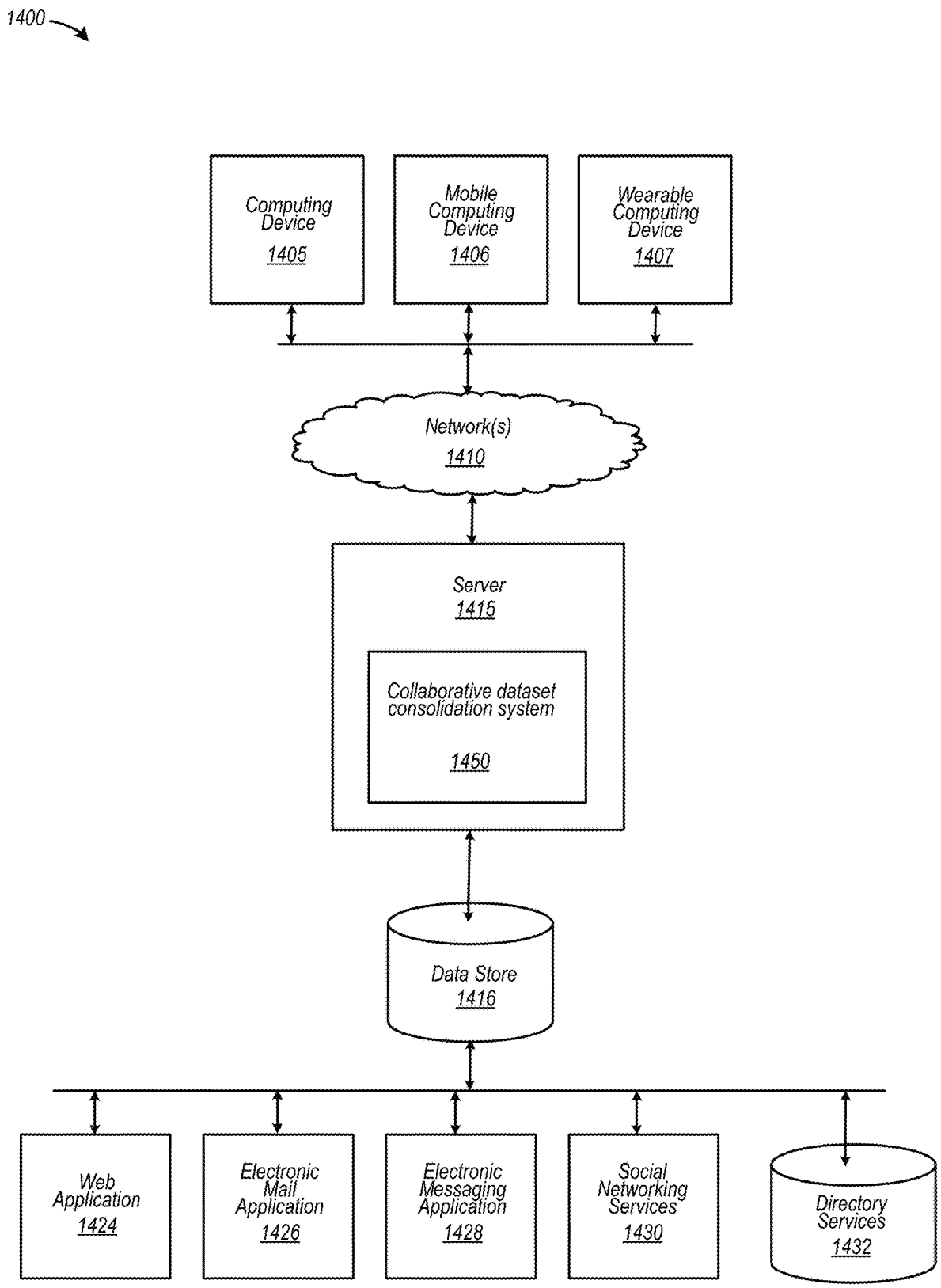
FIG. 14 depicts an example of a system architecture configured to correlate subsets of parallelized data from disparately-formatted data sources to identify entity data based on aggregated or clustered content graph data portions, according to an example.

FIG. 14 depicts an example of a system architecture configured to correlate subsets of parallelized data from disparately-formatted data sources to identify entity data based on aggregated or clustered content graph data portions, according to an example. Data constituting executable instructions (e.g., remote applications) and other content, such as text, video, audio, etc. may be stored in (or exchanged with) various communication channels or storage devices. For example, various units of message data or content may be stored using one or more of a web application 1424 (e.g., a public data source, such as a news aggregation web site), an email application service 1426, an electronic messaging application 1428 (e.g., a texting or messenger application), social networking services 1430 and a services platform and repository 1432 (e.g., cloud computing services provided by Google® cloud platform, an AWS® directory service provided by Amazon Web Services, Inc., or any other platform service). A server 1415 may implement a collaborative dataset consolidation system application 1450 to perform various functionalities as described herein. As an example, server 1415 may be a web server providing the applications 1450 via networks 1410. As an example, a client computing device may be implemented and/or embodied in a computer device 1405, a mobile computing device 1406 (e.g., a smart phone), a wearable computing device 1407, or other computing device. Any of these client computing devices 1405 to 1407 may be configured to transmit electronic messages and content (e.g., as electronic text or documents, video content, audio content, or the like) from data store 1416, and may be configured to receive content (e.g., other electronic content), whereby collaborative dataset consolidation system application 1450 may be configured to correlate subsets of parallelized data from disparately-formatted data sources to identify entity data based on aggregated or clustered content graph data portions.

Figure 15:
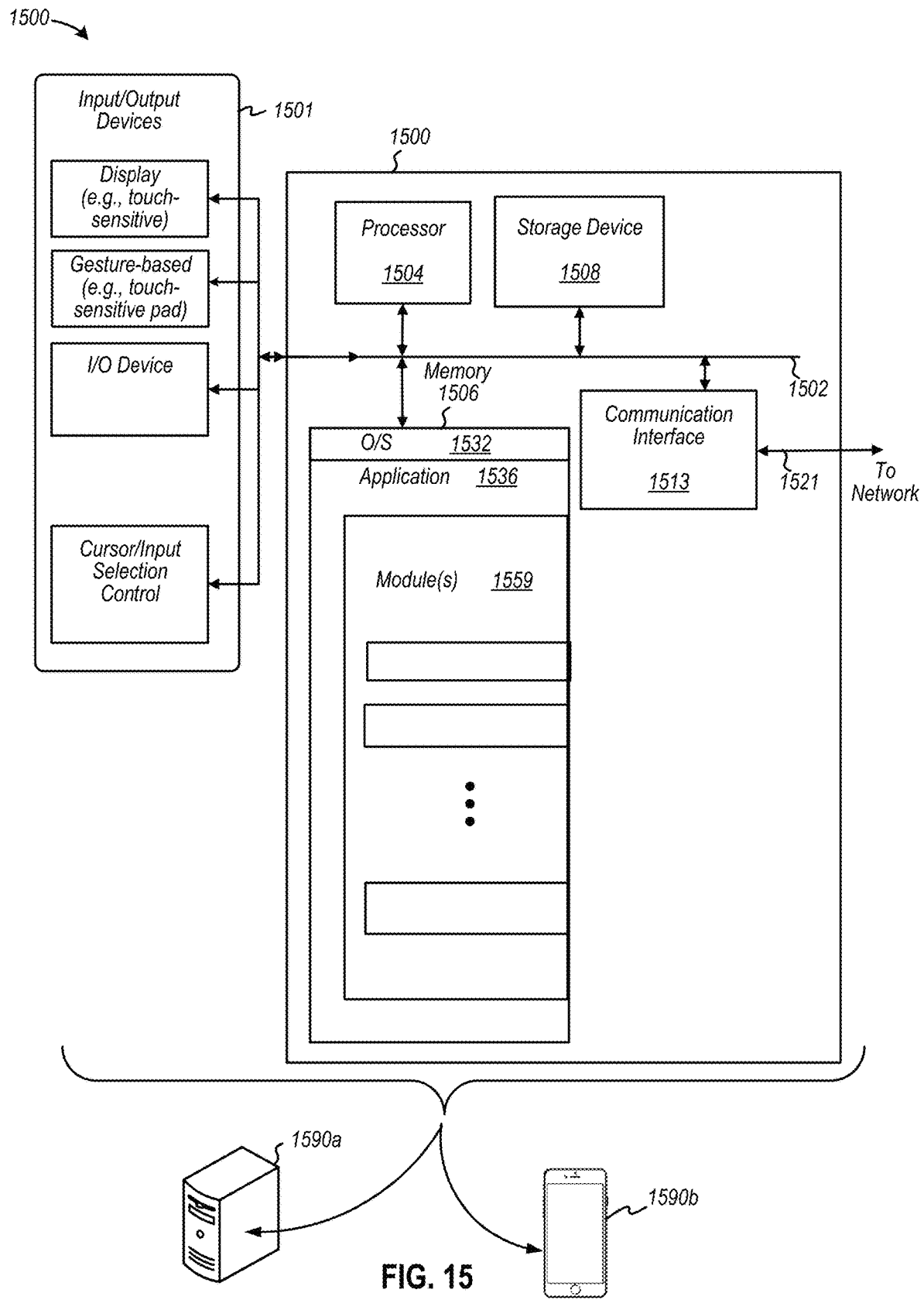
FIG. 15 illustrates examples of various computing platforms configured to provide various functionalities to components of a computing platform 1500 configured to provide functionalities described herein.

FIG. 15 illustrates examples of various computing platforms configured to provide various functionalities to components of a computing platform 1500 configured to provide functionalities described herein. Computing platform 1500 may be used to implement computer programs, applications, methods, processes, algorithms, or other software, as well as any hardware implementation thereof, to perform the above-described techniques.

In some cases, computing platform 1500 or any portion (e.g., any structural or functional portion) can be disposed in any device, such as a computing device 1590a, mobile computing device 1590b, and/or a processing circuit in association with initiating any of the functionalities described herein, via user interfaces and user interface elements, according to various examples.

Computing platform 1500 includes a bus 1502 or other communication mechanism for communicating information, which interconnects subsystems and devices, such as processor 1504, system memory 1506 (e.g., RAM, etc.), storage device 1508 (e.g., ROM, etc.), an in-memory cache (which may be implemented in RAM 1506 or other portions of computing platform 1500), a communication interface 1513 (e.g., an Ethernet or wireless controller, a Bluetooth controller, NFC logic, etc.) to facilitate communications via a port on communication link 1521 to communicate, for example, with a computing device, including mobile computing and/or communication devices with processors, including database devices (e.g., storage devices configured to store atomized datasets, including, but not limited to triplestores, etc.). Processor 1504 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1500 exchanges data representing inputs and outputs via input-and-output devices 1501, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1501 may be implemented as, or otherwise substituted with, a user interface in a computing device associated with, for example, a user account identifier in accordance with the various examples described herein.

According to some examples, computing platform 1500 performs specific operations by processor 1504 executing one or more sequences of one or more instructions stored in system memory 1506, and computing platform 1500 can be implemented in a client-server arrangement, peer-to-peer arrangement, or as any mobile computing device, including smart phones and the like. Such instructions or data may be read into system memory 1506 from another computer readable medium, such as storage device 1508. In some examples, hard-wired circuitry may be used in place of or in combination with software instructions for implementation. Instructions may be embedded in software or firmware. The term "computer readable medium" refers to any tangible medium that participates in providing instructions to processor 1504 for execution. Such a medium may take many forms, including but not limited to, non-volatile media and volatile media. Non-volatile media includes, for example, optical or magnetic disks and the like. Volatile media includes dynamic memory, such as system memory 1506.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1502 for transmitting a computer data signal.

In some examples, execution of the sequences of instructions may be performed by computing platform 1500. According to some examples, computing platform 1500 can be coupled by communication link 1521 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1500 may transmit and receive messages, data, and instructions, including program code (e.g., application code) through communication link 1521 and communication interface 1513. Received program code may be executed by processor 1504 as it is received, and/or stored in memory 1506 or other non-volatile storage for later execution.

In the example shown, system memory 1506 can include various modules that include executable instructions to implement functionalities described herein. System memory 1506 may include an operating system ("O/S") 1532, as well as an application 1536 and/or logic module(s) 1559. In the example shown in FIG. 15, system memory 1506 may include any number of modules 1559, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1559 of FIG. 15, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1559 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1559 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1559 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   receiving data from multiple data sources at a computing system including one or more processors and memory configured to process the data in parallel to form parallelized data, the parallelized data being further converted by a format converter to graph-based data from one or more of the multiple data sources;
   classifying data representing a subset of the parallelized data to identify a class of observation data;
   identifying data representing one or more entity attributes associated with the observation data;
   constructing one or more content graphs in a graph data format based on the class of observation data and the one or more entity attributes;
   correlating the subset of the parallelized data to other subsets of the parallelized data associated with the class of observation data to form correlated subsets of the parallelized data;

aggregating data representing individual entities to form a set of entities based on the correlated subsets of the parallelized data; and modifying a graph data arrangement to enrich data stored in association thereof.

2. The method of claim 1 wherein modifying the graph data arrangement further comprises:

modifying a knowledge graph data arrangement.

3. The method of claim 1 further comprising:

receiving the parallelized data from the multiple data sources in different data formats; and converting the parallelized data in the different data formats into the graph data format.

4. The method of claim 1 wherein receiving the data from the multiple data sources comprises:

ingesting the parallelized data; and modifying a subset of the parallelized data.

5. The method of claim 1 further comprising:

analyzing a subset of the parallelized data to detect noncompliant data; and quarantining a subset of the noncompliant data.

6. The method of claim 1 wherein correlating the subset of the parallelized data comprises:

forming an adjacency node for the correlated subsets of the parallelized data; and linking multiple adjacency nodes to identify an individual entity.

7. The method of claim 6 further comprising:

clustering the correlated subsets of the parallelized data to identify the individual entity.

8. The method of claim 6 further comprising:

clustering the individual entity with data representing other individual entities to form clustered individual entities; and forming a group of individual entities based on the clustered individual entities.

9. The method of claim 1 wherein correlating the subset of the parallelized data comprises:

identifying data representing a first attribute representing a name; and identifying data representing a second attribute representing a geographic location.

10. The method of claim 9 further comprising:

forming a first subset of adjacency nodes associated with a subset of data representing the first attribute representing the name; and forming a second subset of adjacency nodes associated with a subset of data representing the second attribute representing the geographic location.

11. The method of claim 10 further comprising:

implementing the first subset of adjacency nodes and the second subset of adjacency nodes to cluster to aggregate the data representing the individual entities to form the set of entities, wherein each individual entity includes data representing an individual person.

12. The method of claim 11 further comprising:

aggregating the data representing the individual person with data representing other individual persons to form a group of individual persons.

13. A system comprising:

a data store configured to receive streams of data via a network into an application computing platform; and a processor configured to execute instructions to implement an application configured to:

receive data from multiple data sources at a computing system including one or more processors and memory configured to process the data in parallel to form parallelized data, the parallelized data being further converted by a format converter to graph-based data from one or more of the multiple data sources;

classify data representing a subset of the parallelized data to identify a class of observation data;

identify data representing one or more entity attributes associated with the observation data;

construct one or more content graphs in a graph data format based on the class of observation data and the one or more entity attributes;

correlate the subset of the parallelized data to other subsets of the parallelized data associated with the class of observation data to form correlated subsets of the parallelized data;

aggregate data representing individual entities to form a set of entities based on the correlated subsets of the parallelized data; and modify a graph data arrangement to enrich data stored in association thereof.

14. The system of claim 13 wherein the processor is further configured to:

modify a knowledge graph data arrangement implemented at the graph data arrangement.

15. The system of claim 13 wherein the processor is further configured to:

receive the parallelized data from the multiple data sources in different data formats; and convert the parallelized data in the different data formats into the graph data format.

16. The system of claim 13 wherein the processor is further configured to:

ingest the parallelized data; and modify a subset of the parallelized data to clean the subset of the parallelized data.

17. The system of claim 13 wherein the processor is further configured to:

analyze a subset of the parallelized data to detect noncompliant data; and quarantine a subset of the noncompliant data.

18. The system of claim 13 wherein the processor is further configured to:

form an adjacency node for the correlated subsets of the parallelized data; and link multiple adjacency nodes to identify an individual entity.

19. The system of claim 13 wherein the processor is further configured to:

cluster the correlated subsets of the parallelized data to identify an individual entity based on linked adjacency nodes.

20. The system of claim 13 wherein the processor is further configured to:

identify data representing a first attribute representing a name; and identify data representing a second attribute representing a geographic location, wherein the data representing the first attribute and the second attribute may be associated with the class of observation data and an adjacency node.

* * * * *